United States Patent [19]

Takashima et al.

[11] Patent Number: 4,701,864

[45] Date of Patent: Oct. 20, 1987

[54] MEMORY CONTROL APPARATUS FOR A CRT CONTROLLER

[75] Inventors: Shigekazu Takashima, Yokohama; Tsutomu Sakamoto, Yokosuka, both of Japan

[73] Assignee: Kabushiki Kaisha Toshiba, Kawasaki, Japan

[21] Appl. No.: 716,135

[22] Filed: Mar. 26, 1985

[30] Foreign Application Priority Data

| | | | |
|---|---|---|---|
| Mar. 28, 1984 | [JP] | Japan | 59-60212 |
| Sep. 27, 1984 | [JP] | Japan | 59-202706 |
| Dec. 27, 1984 | [JP] | Japan | 59-274032 |

[51] Int. Cl.[4] .......... G06F 3/14

[52] U.S. Cl. .......... 364/521; 340/723; 340/799; 364/518

[58] Field of Search .......... 364/518, 521; 340/798, 340/799, 752, 720, 723, 734; 382/48

[56] References Cited

U.S. PATENT DOCUMENTS

| | | | |
|---|---|---|---|
| 4,053,946 | 10/1977 | Opittek et al. | 364/900 |
| 4,379,293 | 4/1983 | Boisvert et al. | 340/798 X |
| 4,434,503 | 2/1984 | Tanaka et al. | 340/798 X |
| 4,517,654 | 5/1985 | Carmean | 364/521 |
| 4,570,161 | 2/1986 | Kummer et al. | 340/799 |
| 4,580,230 | 4/1986 | Jones et al. | 364/521 |

*Primary Examiner*—Errol A. Krass
*Assistant Examiner*—H. R. Herndon
*Attorney, Agent, or Firm*—Cushman, Darby & Cushman

[57] ABSTRACT

A memory control apparatus for a CRT controller in which the same data from a data input circuit is loaded into a plurality of addresses of a buffer memory for storing drawing data, the address of the buffer memory being automatically updated. X- and Y- address generators update address data in response to pulses from X- and Y-axis pulse generators. A microprocessor supplies to a register the width of the X and Y thickness of an address to be updated, coordinate data representing a write start point to the address generators, and the drawing data to be written to a data input circuit. The memory can then be updated in units specified by the X and Y thickness of the picture element.

11 Claims, 20 Drawing Figures

MEMORY CONTROL APPARATUS FOR A CRT CONTROLLER

BACKGROUND OF THE INVENTION

Field of the Invention

The present invention relates to a memory control apparatus for use in a CRT controller which is used as a receiving terminal for TELETEXT, VIDEOTEX, or the like.

Recently, TELETEXT and VIDEOTEX, in which characters and graphics representing a variety of useful information are transmitted to users through a transmission medium, have been developed in many countries. Particularly, in Canada and the USA, NAPLPS (North American Presentation Level Protocol Syntax) has been standardized as a presentation level protocol. An image is resolved into basic graphical elements such as a point, line, and arc which are coded and sent together with the coordinate data. This system is generally called an alpha geometric system.

In this field, a new system has been developed in which a picture description instruction (PDI) is used for the picture data transmission. PDI contains instructions for drawing the basic graphical elements on a CRT screen and instructions for designating the color of a picture. The picture information is expressed using combinations of various PDIs. To process the PDI signal, a microprocessor (MPU) is used. The MPU, upon receipt of the PDI signal, distingushes the type of a picture to be drawn and reads out a processing routine necessary for drawing the picture from memory. In the picture processing routine, the data which is included in the PDI is used to specify a coordinate position on the screen. The coordinate position of a picture element (abbreviated to "pel") corresponding to a specific address in a buffer memory on a locus of the picture is calculated by a programmed algorithm. The data is written into the buffer memory. This process is repeated, and the picture is drawn. When the drawing positions are the same as positions which were previously determined, the previous image data is replaced by the present image data in the buffer memory. After the data processing of various PDIs, the pictorial information is generated. The PDI receiving terminal for drawing a picture by this processing thus needs a picture memory control circuit which can write the data in units of a display element to the buffer memory.

In the PDI receiving terminal described above, the thickness of a line in a picture is determined by the concrete thickness of one pel. Therefore, in order to draw a picture with a thick line, it is necessary to transmit a PDI many times to displace drawing points on the CRT screen. However, this repetitive transmission of instructions deteriorates the data transmission efficiency.

To solve the above problem, there is a proposal in which a command to specify a logical pel is additionally contained in the transmitted PDI. The logical pel defines the thickness of a line in drawing line figures.

A command signal for specifying a logical gel contains signals representing a horizontal size (dX) and a vertical size (dY) of the logical pel. dX and dY are integer multiples of one pel. When the command signal specifying the logical pel is received, the MPU sets a write address designating a start point in the buffer memory. The data to be written in the address designating the start point is contained in the PDI. Then, the MPU writes the data of one pel into the write address and updates the write address to fill the logical pel (thickness) with the horizontal size (dX) and the vertical size (dY) as specified. Every time the write address is updated, the MPU writes the one pel of data into the updated write address. The updated processing of the write address and the writing of one pel of data are alternately performed as designated by software in the MPU. Therefore, as the horizontal size (dX) and the vertical size (dY) of the pel transmitted becomes larger, the data writing time to fill the size of the pel is longer.

The logical pel processing function provides a substantially constant transmitting time for pictorial data regardless of the sizes of the logical pel lines. On the other hand, the time necessary for processing one PDI is increased as the thickness of the drawing line by the logical pel is thicker, for the data write processing to the buffer memory by the MPU takes longer. As a result, there often occurs a case that the PDI processing is not completed when the next PDI is received. The receiving terminal thus needs a great capacity of memory for storing the received data (PDI). Additional disadvantages are that the software of the MPU is complicated and that the data processing load of the MPU is large.

SUMMARY OF THE INVENTION

Accordingly, an object of the present invention is to provide a memory control apparatus for use in a CRT controller which processes drawing information written into a buffer memory by setting a start point of the a write address of drawing data so that the drawing data can automatically be written into an address corresponding to a logical pel, wherein the logical pel processing by the MPU can be performed regardless of the thickness of the line as determined by a logical pel.

Another object of the present invention is to provide a memory control apparatus for a CRT controller which has a buffer memory containing a write permitting area and a write inhibiting area, and when an address specified by a logical pel bridges both the memory areas, data writing into the write inhibiting area is automatically inhibited such that the load of the MPU on the data processing by the software is lessened.

To achieve the objects stated above, there is provided a memory control apparatus for a CRT controller which comprises:

a buffer memory addressed by X and Y addresses defining coordinates on a CRT screen;

a data input circuit for supplying drawing data to the buffer memory;

means for producing a write pulse for enabling the buffer memory to store the drawing data; and means for updating the address to store the drawing data in each of the addresses, including:

initial means for producing initial address data designating the initial X and Y addresses, means for interrupting the updating for the X and Y addresses, means for updating the X address while the Y address is fixed, means for updating the Y address while the X address is fixed, and means for updating the X and Y addresses repeatedly according to the thickness of the drawing.

BRIEF DESCRIPTION OF THE DRAWINGS

FIGS. 2A-1, 2A-2 and 2B cooperate to show a circuit diagram illustrating the respective portions of the circuit of FIG. 1;

DETAILED DESCRIPTION OF THE PREFERRED EMBODIMENTS

Some specific but preferred embodiments of the present invention will be described referring to the accompanying drawings.

Figure 1:
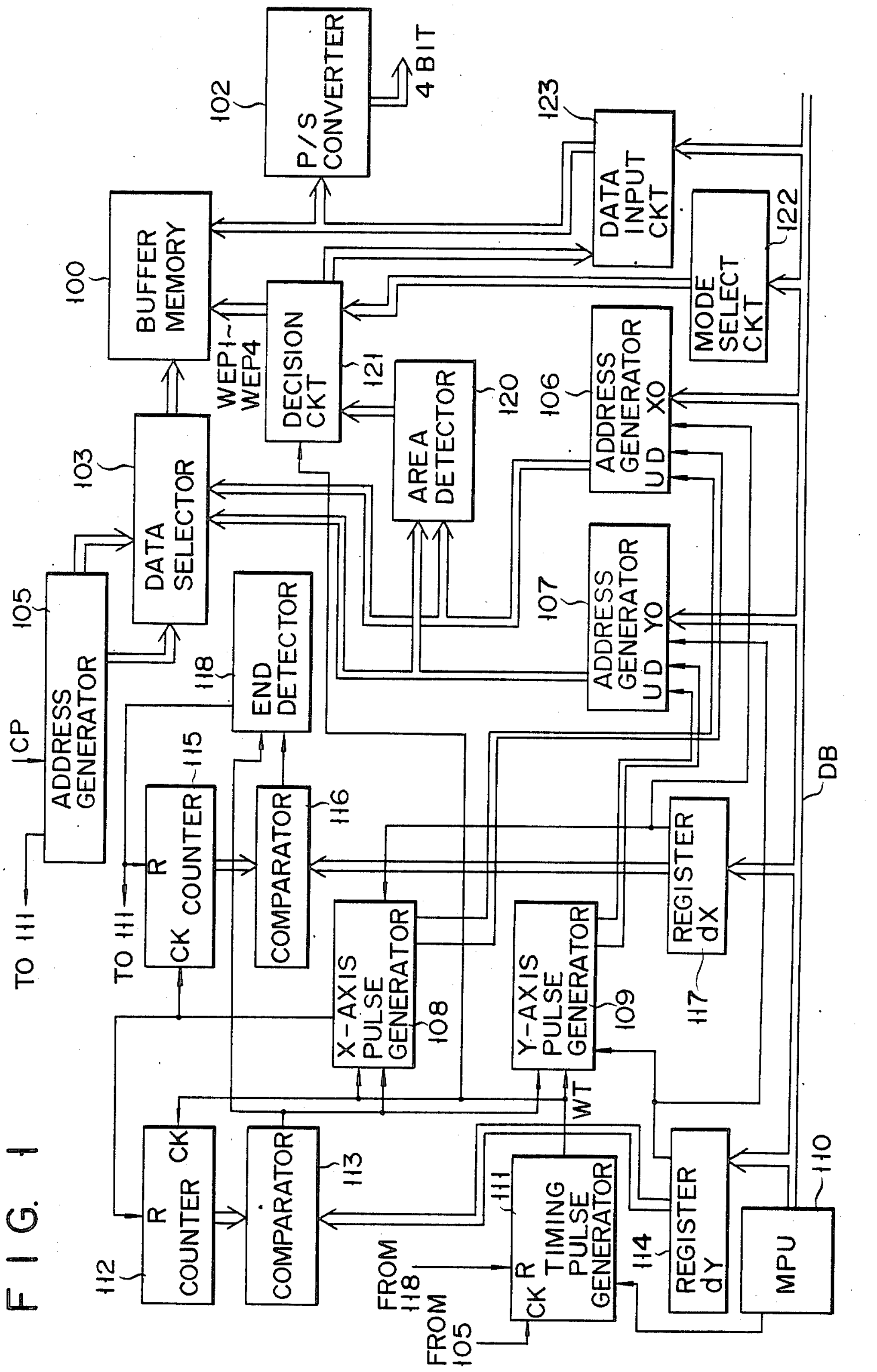
FIG. 1 shows a block diagram of an embodiment of the present invention.

In FIG. 1, illustrating a first embodiment of the present invention, 16 bits of data from a buffer memory 100 are supplied to a parallel/serial converter 102. In the converter, the 16-bit output data is converted into four sets of serial data each consisting of 4 bits. A read address of the buffer memory 100 is specified by address data generated by the address generator 105 and applied thereto through a data selector 103. The selector 103 also responds to a timing pulse from the address generator 105. The selector 103 additionally selects write address data from write address generators 106 and 107 and supplies this data to the buffer memory 100.

The generator 106 generates x-axis address data of the buffer memory 100. An initial value Xo of the generator 106 is applied through a data bus DB. The write address generator 107, on the other hand, generates y-axis address data of the buffer memory 100. An initial value Yo of the generator 107 is also supplied from the data bus DB. The initial values Xo and Yo are derived from microprocessor (MPU) 110.

X-axis pulse generator 108 supplies a clock pulse to an up-count input port and a down-count input port of the write address generator 106, and Y-axis pulse generator 109 supplies a clock pulse to an up-count and a down-count input port of the write address generator 107. The pulse generators 108 and 109 function to change address data in the write address generators 106 and 107 and to update the write address of the buffer memory 100.

The Y-axis pulse generator 109 produces a clock pulse every time it receives a pulse WT from a timing pulse generator 111. Upon receipt of a coincident pulse from a comparator 113, the Y-axis pulse generator 109 is switched either to an output mode of down-count or up-count. The initial output mode is set up by a sign bit from a register 114. The X-axis pulse generator 108 also produces a clock signal when both the coincident pulse from the comparator 113 and the pulse WT is supplied thereto. In this case, the output mode of down-count or up-count is set up by a sign bit from the register 117.

The comparator 113 compares the output signal of a counter 112 with the output signal (excluding the sign bit) from a register 114. The comparator 113 outputs a pulse when both inputs are coincident. The counter 112 starts to count up when its clock input port receives the pulse WT from the timing pulse generator 111. The data specifying the Y-axis width dY is applied from MPU 110 to the register 114 through the data bus DB. Thus, when the number of the pulse WT corresponds to the Y-axis width dY at the counter 112, the comparator 113 produces a coincident pulse. This means that the write address data of the buffer memory 100 is updated depending on the width dY and the timing of the pulse WT. Since the coincident pulse from the comparator 113 selects the up-count mode or the down-count mode of the Y-axis pulse generator 109, the direction of a change of the write address is alternately reversed at every width dY.

When the coincident pulse is produced from the comparator 113, the X-axis pulse generator 108 resets the counter 112, and it simultaneously applies a clock pulse to a counter 115. The X-axis pulse generator 108 also applies a clock pulse to the address generator 106. Therefore, when the direction of the change of the write address on the Y-axis is reversed, the write address on the X-axis also changes.

In the comparator 116, the output signal of the counter 115 is compared with the output signal of the register 117. The data specifying the X-axis width dX is supplied from MPU 110 to the register 117 by way of the data bus DB. Accordingly, when the Y-axis coincident pulse whose number corresponds to the X-axis width dX is produced by the comparator 113, the comparator 116 produces an X-axis coincident pulse. When the X-axis coincident pulse is produced from the comparator 116, the addresses designated by widths dX and dY in the memory are all updated. This state is equivalent to the completion of the operation; therefore, the X-axis coincident pulse from the comparator 116 is supplied to an end detector 118 along with pulse WT. The end detector 118 resets the counter 115 and the timing pulse generator 111 when receiving the pulse WT and the coincident pulse from the comparator 116.

The timing pulse generator 111 is loaded by MPU 110 and uses the output pulse from the address generator 105 as a clock pulse. The timing pulse generator 111 is reset by the reset pulse from the end detector 118.

The output signals from the address generators 106 and 107 are applied to an area detector 120. The area detector 120 checks the write address in the buffer memory 100. When the output address signals of the generators 106 and 107 specify a predetermined address in the buffer memory 100, the area detector 120 supplies the detected signal to a decision circuit 121. Usually, the decision circuit 121, when receiving the pulse WT from the timing pulse generator 111, produces write permission signals WEP1 to WEP4. The decision circuit 121 prohibits the outputting of the write permission signals WEP1 to WEP4 in response to the data contents of mode select circuit 122 and the area detector 120. The mode select circuit 122 holds data to designate a write permission area and a write prohibition area, which is applied from MPU 110. When the write permission pulses WEP1 to WEP4 are produced from the decision circuit 121, write data from a data input circuit 123 is written into the buffer memory 100. The write data is written into the data input circuit 123 from MPU 110 by way of the data bus DB.

In the above-mentioned embodiment, the buffer memory 100 has a memory area corresponding to the two-dimensional coordinates of the screen. A unit address of a particular two-dimensional coordinate may be designated by a set of X and Y axis address data. The drawing data written into the unit address from the data input circuit 123 corresponds to one picture element (one dot) on the CRT screen. The write address of the buffer memory 100 is changed by the address updating means comprised of the address generators 106 and 107, the pulse generators 108 and 109, the counters 112 and 115, the comparators 113 and 116, the registers 114 and 117, and the end detector 118. The timing pulse signal for determining the write timing of the buffer memory 100 is produced by a timing pulse inputting means comprised of the timing pulse generator 111 and the data selector 103.

When the specifying data from the area specifying means is coincident with the area deciding data, the decision circuit 121 produces a write permission pulse for transmission to the buffer memory 100. When these pieces of data are not coincident with each other, however, the circuit 121 stops the outputting of the permission pulse.

According to the above-mentioned embodiment of the present invention, once MPU 110 sets data in the write address generators 106 and 107, the registers 114 and 117, the mode select circuit 122 and the data input circuit 123, the drawing data is automatically written into the address corresponding to the position of the logical picture element (pel) which is set by the widths dX and dY. Further, unnecessary data is never written into a write prohibition area. As a result, the processing load of the MPU by the software is lessened.

The present invention will further be described referring to more detailed circuit diagrams. In the description to follow, a system to which the present invention is applied has a standard display function of NAPLPS.

Figures 1, 2A:
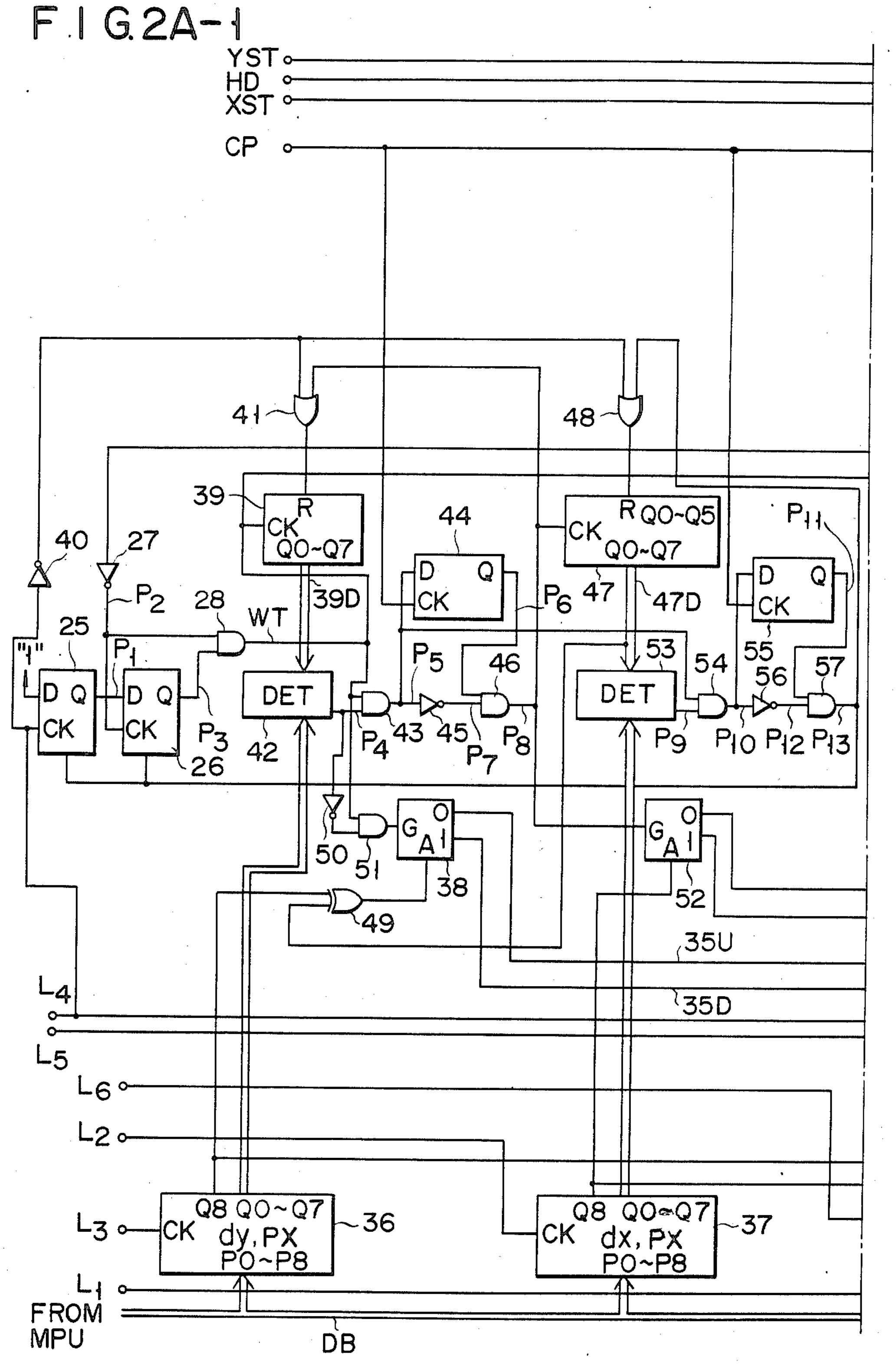
Figures 2, 2A:
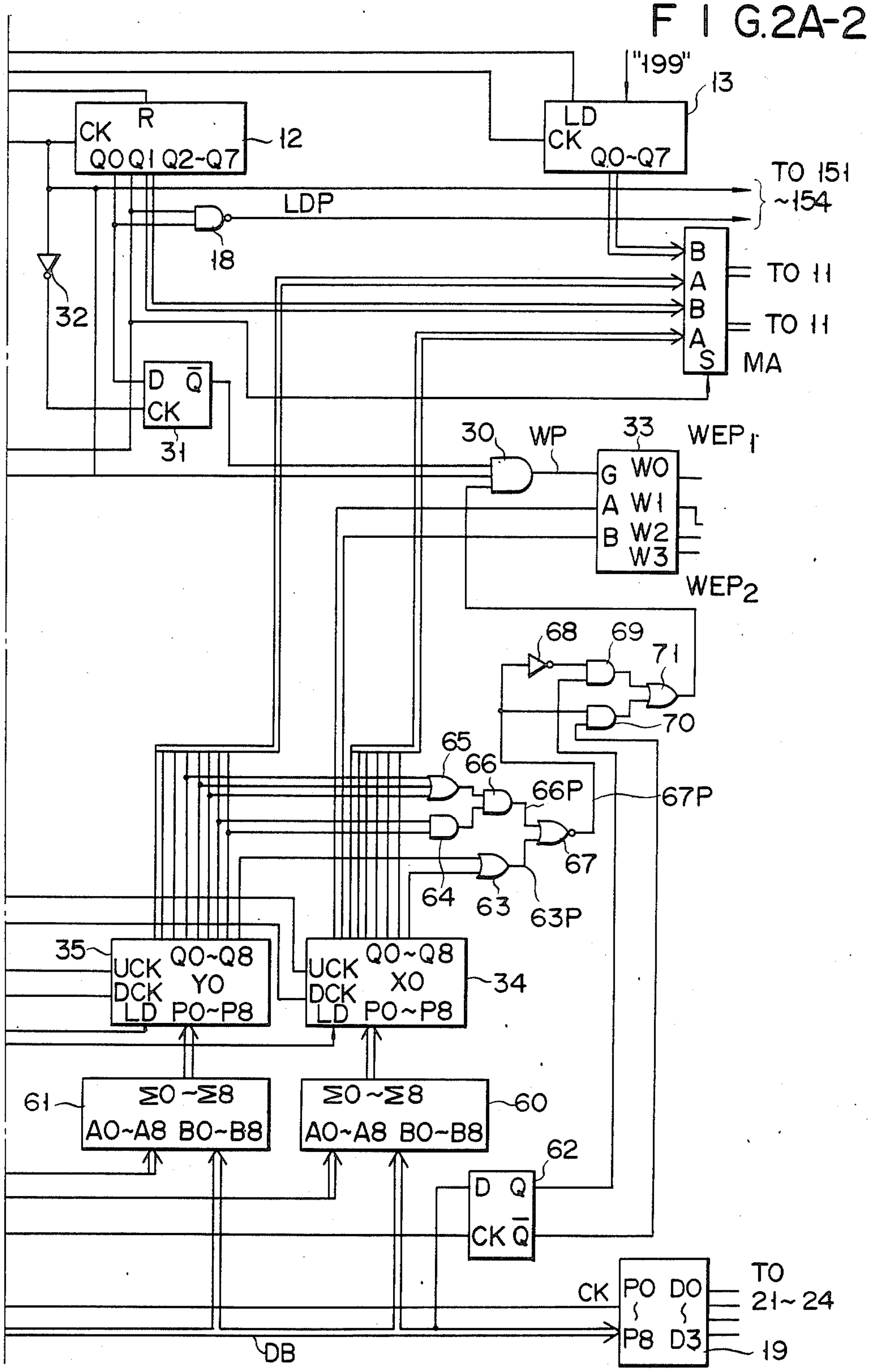
Figure 3:
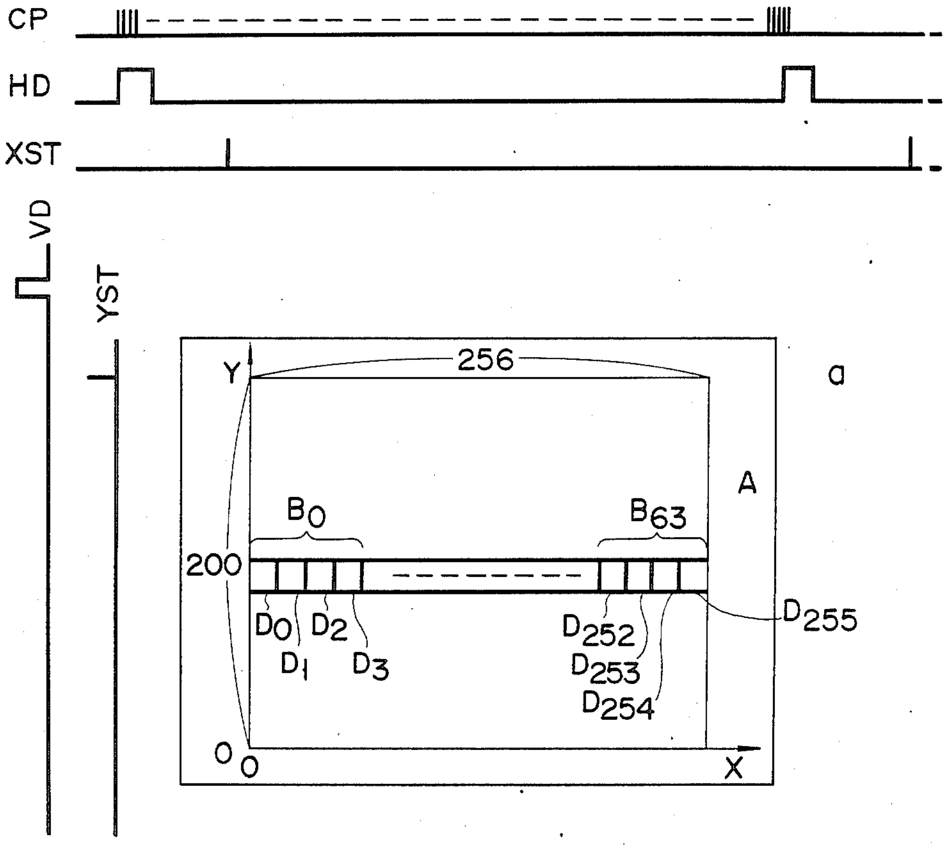
FIG. 3 is a view illustrating a standard picture display area of NAPLPS.

In FIG. 3 is shown a standard picture element display area (A), which contains 256 dots in the horizontal direction and 200 dots in the vertical direction. For the standard display function of NAPLPS, the number of bits of the drawing data Dn for each dot is 4 bits. Therefore, the drawing data Dn allows use of 16 ($2^4$) colors. The standard picture element display area (A) is smaller in size than the CRT screen. The display data displayed in the standard picture element display area (A ) is produced from the buffer memory 11 shown in FIG. 2.

Figure 2B:
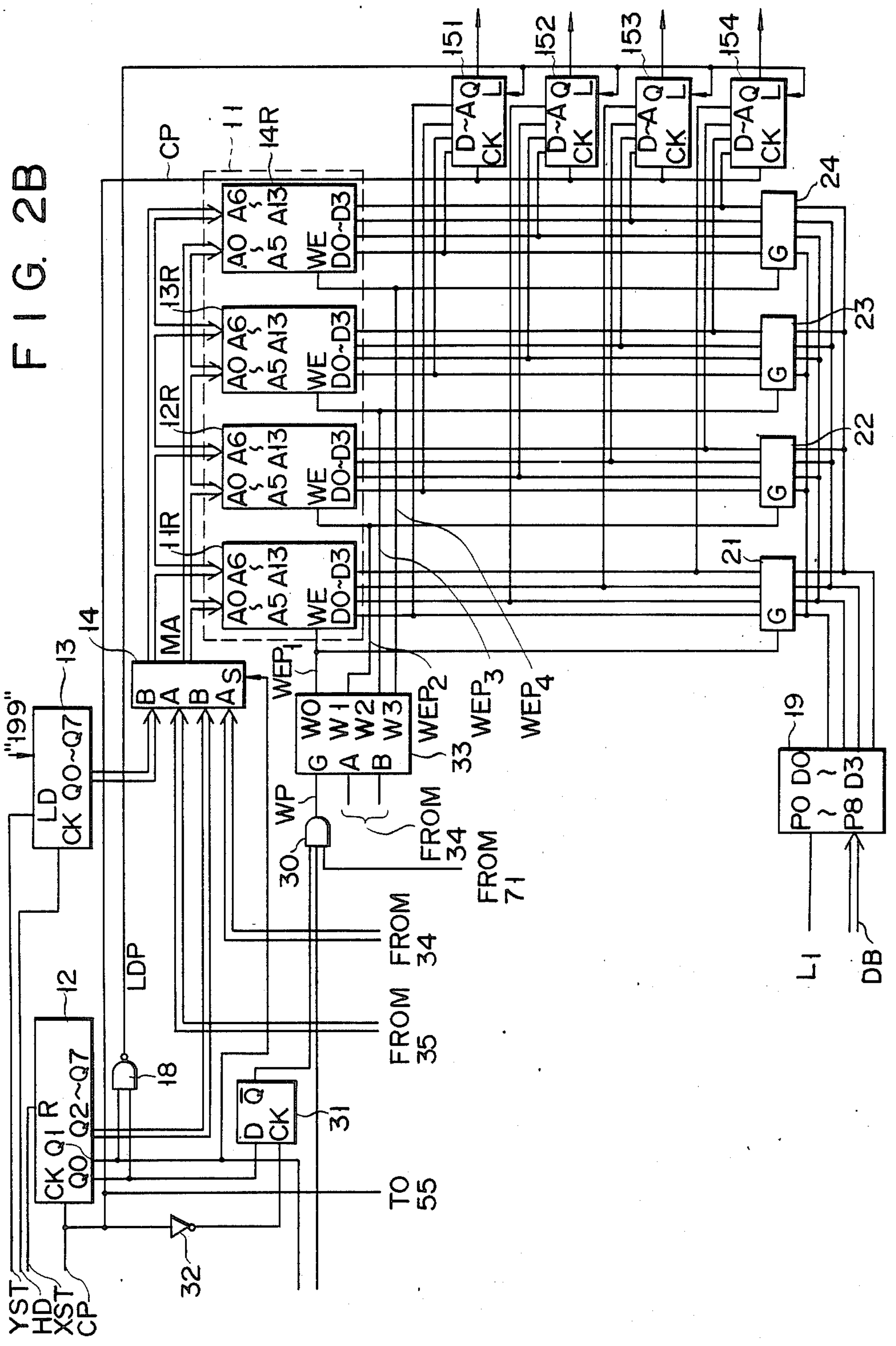

In FIG. 2B, reference numeral 11 designates a buffer memory. The buffer memory 11 is a two-dimensional memory whose addresses respectively correspond to picture elements of the X-Y coordinates on the picture display area (A) shown in FIG. 3, in one-to-one correspondence. The buffer memory 11 is composed of four RAMs 11R to 14R. Each of the RAMs 11R to 14R has a memory capacity of $4\times16$ Kbits. In the image display area A, the drawing data Dn ($0\leqq n\leqq 255$) displayed on each horizontal line is divided into 64 blocks (Bm), each consisting of 4 dots, as shown in FIG. 3. Thus, for Bm, $0\leqq m\leqq 63$, and the image data of 4 dots in each block Bm is loaded bit by into RAMs 11R to 14R.

Respective single bits of the 4-bit data (one dot of drawing data) read out from RAM 11R are supplied bit by bit into parallel/serial converters 151 to 154. The 4-bit data read out of RAM 12R is also inputted into parallel/serial converters 151 to 154. Similarly, the 4-bit data read out of RAMs 13R and 14R is inputted into parallel/serial converters 151 to 154. In this case, the horizontal addresses A0 to A5 of RAMs 11R to 14R may have the same contents. The reason for this is that the bit input positions of the bits from RAMs 11R to 14R to the parallel/serial converter 151 to 154 are different from each other. Accordingly, once the horizontal addresses A0 to A5 with the same contents are specified to RAMs 11R to 14R, the data consisting of a total of 16 bits (4 dots) is inputted into parallel/serial converters 151 to 154.

Relationships among the blocks Bm, the drawing data Dn (4 bits) and the X-axis value (4K) of the image display area A now will be described.

The drawing data Dn in RAM 11R is grouped in fours to equal one unit m of the block (i.e. 4n=m). Thus, in RAM 11R is stored every fourth pel of drawing data D0, D4, D8, D12, . . . ($0\leqq m\leqq 63$). As a result, n of the drawing data Dn in RAMs 12R to 14R correspond to 4m+1, 4m+2, 4m+3, respectively. In other words, the drawing data corresponding to the physical picture element of which the X coordinate value is expressed by 4k ($0\leqq k\leqq 63$) is loaded into the address k (=m) in RAM 11R. Similarly, the drawing data corresponding to the physical pel of which the X-axis values are 4k+1, 4k+2, 4k+3, is loaded in to the respective specified address k (=m).

As described above, drawing data of 4 dots (16 bits) are concurrently read out of the buffer memory 11 by addressing all the drawing data at one time. During the display period of the 4 dots of drawing data, in the buffer memory 11 the 4 dots of drawing data in the next block are read out. The parallel/serial converters 151 to 154 are designed so as to receive data when they receive a load pulse LDP.

In FIG. 2, a counter 12 generates an address for reading out the horizontal data. The counter 12 is an up-counter of 8 stages for counting pulses of a display clock (CP). The counter 12 is reset by a pulse XST which is produced at a time earlier (corresponding to four display clocks) than the horizontal display start timing $T_H$. As a result, in the buffer memory 11, during the display period Tm of the drawing data of each block Bm, the drawing data of 4 dots in the next block Bm+1 is addressed.

The counter 13 is a presetable counter of 8 stages. In this counter, its count is preset to "199" in response to a pulse YST produced at the vertical direction start timing (see FIG. 3). Subsequently, this preset value is counted down to "0" one by one for each horizontal line by counting the horizontal drive pulses (HD). The reason why the preset value of the counter 13 is 199 is that the Y-axis value of the display start line in NAPLPS is 199. Accordingly, the output address of the counter 13 is made coincident with the Y-axis value of the image display area A.

Figure 4:
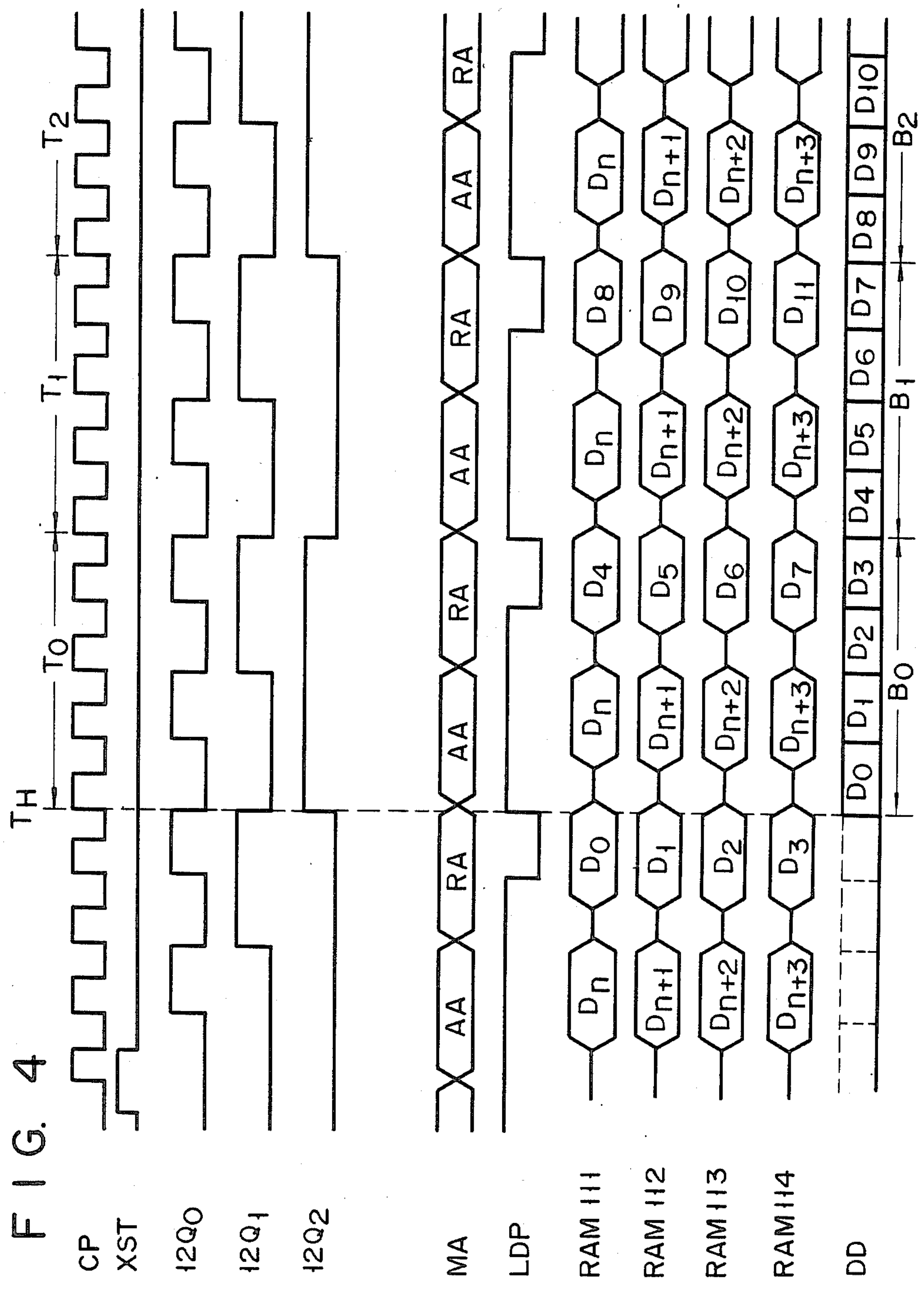
FIG. 4 shows a timing chart for illustrating the data read out operation in the circuit of FIG. 1.

The output addresses of the counters 12 and 13 are applied to the buffer memory 11 through a data selector 14. In this case, the counter 13 applies the outputs from all of the stages to the buffer memory 11. The counter 12 applies the outputs of only the upper six stages to the buffer memory 11. Accordingly, 4 dots of drawing data are concurrently read out from RAMs 11R to 14R of the buffer memory 11 by one time addressing, as shown in FIG. 4. The parallel data of 4 dots (16 bits) thus read out are loaded into the parallel/serial converters 151 to 154. Then, the parallel/serial converters 151 to 154 sequentially produce serial data comprising a train of data units each consisting of one dot (4 bits) according to the display clock (CP) denoted as DD, as shown in FIG. 4.

The load pulse (LDP) for loading 4 dots of drawing data concurrently outputted from the buffer memory 11 into the parallel/serial converters 151 to 154 is produced from a NAND circuit 18 shown in FIG. 2. For producing the load pulse NAND circuit 18 uses the outputs from the lower two stages of the counter 12 ($12Q_0$ and $12Q_1$ shown in FIG. 4). Therefore, the load pulse LDP is outputted every four display clocks CP. That is, as shown in FIG. 4, it is produced concurrently with the 4th display clock CP during the data display period Tm of each block Bm. Thus, at the time the data is read out for the display in FIG. 3, the drawing data of 256 dots on each horizontal line are divided into 64 blocks (Bm) each consisting of 4 dots. During the display period Tm of the 4 dots of drawing data of each block Bm, the drawing data of 4 dots in the next block Bm+1 are concurrently read out in preparation for the display thereof.

As described above, by concurrently reading out 4 dots of drawing data from the buffer memory 11, the access time to the buffer memory 11 for display purposes is reduced. As a result, during the image display period it is possible to obtain an unused time period. The unused time period can be used for data writing. The FIG. 2 system executes the logical pel processing using this time period.

More specifically, as shown by MA in FIG. 4, when the output signal ($12Q_1$) at the second stage of the counter 12 is logical "1", the data selector 14 selects a read address (RA) of the display data. When it is logical "0", the selector 14 selects an address AA for logical pel processing. As a result, the read operation of the display data is performed in the second half of the display period Tm of each block Bm, while the logical pel processing is performed in the first half.

FIG. 4 shows the output signal ($12Q_2$) at the third stage of the counter 12. As shown, the interval of the output signal is equal to the display period Tm of each block Bm. The details of the address AA for the logical pel processing are supplied from the counters 34 and 35.

The drawing data written into the address corresponding to a logical pel is outputted from the MPU (not shown, and is operable with a 16-bit length) onto the data bus DB and is latched in a latch circuit 19 by latch pulse $L_1$. The latch data is loaded into three-state buffers 21 to 24. These three-state buffers 21 to 24 correspond to RAMs 11R to 14R, respectively. Applied to these three-state buffers 21 to 24 are write permission pulses WEP1 to WEP4 of RAMs 11R to 14R. Normally, outputs of the three-state buffers 21 to 24 are in a high impedance state. When supplied with the write permission pulses WEP1 to WEP4 of the corresponding RAMs 11R to 14R, however, these buffers are placed in an active state, and latch data of the latch circuit 19 is applied to RAMs 11R to 14R. Then, the drawing data is loaded into RAMS 11R to 14R to which the write permission pulses WEP1 to WEP4 are applied.

The generation of the write permission pulses WEP1 to WEP4 will now be given.

Figure 5:
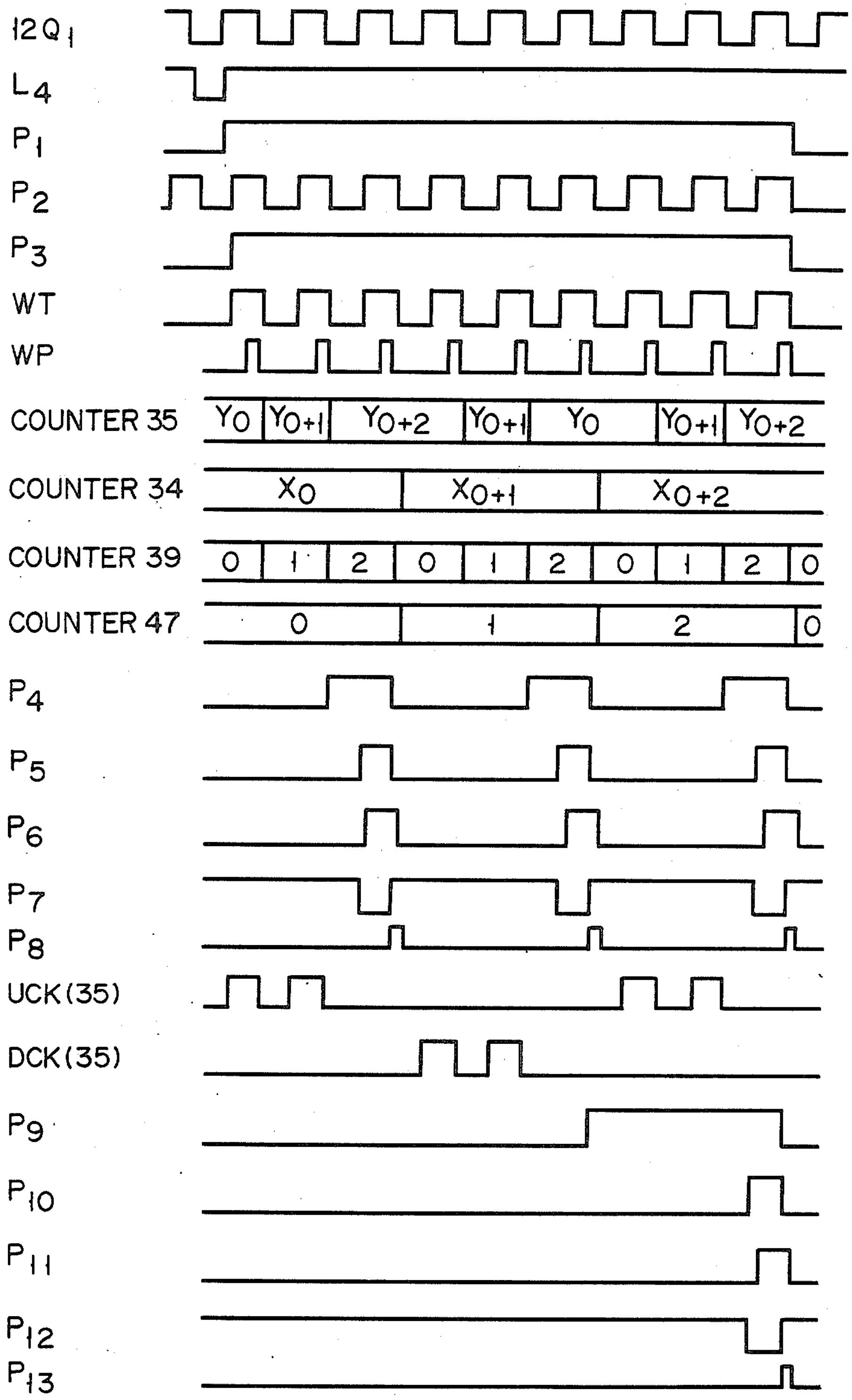
FIG. 5 shows a timing chart for illustrating a logical picture element processing function of the circuit of FIG. 1.

A logical "1" signal is constantly applied to the data input terminal of a D flip-flop 25. A pulse $L_4$ as shown in FIG. 5 is applied to the clock terminal of the D flip-flop 25. The Q output $P_1$ of the D flip-flop 25 rises at the leading edge of the pulse $L_4$, as shown in FIG. 5. The Q output $P_1$ is connected to the data input terminal of a D flip-flop 26. A pulse $P_2$ is applied to the clock input terminal of the D flip-flop 26 (see FIG. 5). The pulse $P_2$ is formed by passing through an inverter 27 the output signal ($12Q_1$) for the second stage of the D flip-flop 26. The Q output $P_3$ of the D flip-flop 26 is thus logical "1" after the Q output $P_1$ rises and at the leading edge of the first pulse $P_2$. When the Q output signal $P_3$ is logical "1", an AND circuit 28 allows a pulse WT to pass therethrough to thereby provide the pulse $P_2$.

The pulse $L_4$ is for designating the logical pel processing and is not synchronized with the data read out for display purposes. The D flip-flops 25 and 26 synchronize the pulse $L_4$ with the output signal $12Q_1$ at the second stage of the counter 12. Through this synchronization, the start timing of the logical pel processing is shifted from the readout timing.

The pulse WT serves as a reference pulse in the generation of the write pulse WP and the write address data in the logical pel processing. This pulse WT is applied to an AND circuit 30. A D flip-flop 31 uses the display clock CP inverted by an inverter 32 as its clock pulse. The D flip-flop 31 delays by a half clock cycle of the display clock CP the output signal $12Q_0$ at the first stage of the counter 12 and applies its inverted output to the AND circuit 30. Accordingly, the AND circuit 30 produces the write pulse WP with a width equal to the output signal $12Q_1$ during the duration of the pulse WT.

This pulse WP is delivered from a data decoder 33 as the write permission pulses WEP1 to WEP4 according to the output signal from the lower two stages of a counter 34. These pulses are selectively applied to RAMs 11R to 14R for specifying a horizontal direction write address data.

The pulse WT is the inverted one of the second stage output $12Q_1$ of the counter 12. During the display period Tm of each block Bm, the drawing data is written one time by the write pulses WP which are formed in synchronism with the pulse WT. As shown in FIG. 5, on equal number of WP pulses to that of the pulses WT are generated. This data writing is performed when the data selector 14 selects the addresses AA of the counters 34 and 35.

The generation of the address data will now be described.

In FIG. 2, a counter 34 generates write address data in the horizontal direction when the logical pel is being processed. A counter 35 generates the write address data in the vertical direction. These counters 34 and 35 are each a presetable up/down counter. The data write addresses outputted from these counters 34 and 35 are applied to the buffer memory 11 through the data selector 14 during the period of the pulse WT that the second stage output $12Q_1$ of the counter 12 is logical "0", as shown in FIG. 4.

In this case, only the upper six stage outputs of the counter 34 are applied to the buffer memory 11. The outputs of the lower two stages are applied to the data decoder 33. Using these outputs, the data decoder 33 decodes the write pulse WP into the write permission pulses WEP1 to WEP4.

The updating of the write addresses data generated by the counters 34 and 35 will now be described.

Figure 6:
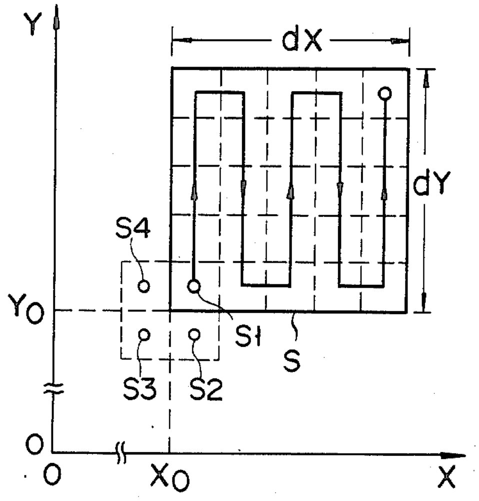
FIGS. 6 to 9 show views for illustrating an address updating function of the FIG. 1 circuit.

Let use consider a logical pel S as shown in FIG. 6. The logical pel S is identified by the data representing the coordinates (Xo, Yo) at its left lower corner as a display position. When the display position data is thus selected, the logical pel S lies in the first quadrant of the X-Y coordinates with an origin of the coordinates (Xo, Yo). The write data and the vertical width dY of the logical pel S have positive values.

In FIG. 6, the arrows in the logical pel S indicate the updating direction of the write address data. As shown, the write address data is such that with the start point of the coordinates (Xo, Yo), when the address of the vertical width dY is updated one time, the horizontal direction address is updated one time. In this case, at the address updating point of the horizontal direction, the vertical direction address starts the updating from the final address during the preceding address updating period. As a result, the write address data is updated while the updating is progressing parallel in the vertical direction and in a zigzag pattern in the horizontal direction. In this case, the counter 35 executes the up-counting at the initial stage, and then alternately executes the up-counting and the down-counting every time the address of the vertical direction width (dY) is updated one time. The counter 34 always executes the up-counting.

The controls of the counters 34 and 35 to set up the address updating mode as mentioned above will not be described.

The MPU produces the data representing the coordinates (Xo, Yo) and outputs it onto the data bus DB. The data representing the X-axis value (Xo) is loaded into the counter 34 in response to the pulse $L_5$ as the load pulse. The data representing the Y-axis value (Yo) is applied to the counter 35 in response to the pulse $L_4$ as the load pulse. Further, the MPU applies to the data bus DB the horizontal width dX of the logical pel S and a sign PX, and the vertical width dY and a sign PY. In this case, the data representing the width actually consists of $dX-1$ and $dY-1$. These pieces of data $dX-1$ and $dY-1$ will be expressed by dx and dy, respectively. The data (PX, dx) and (PY, dy) are latched into latch circuits 37 and 36 at by pulses $L_2$ and $L_3$, respectively.

The data (PX, dx), (PY, dy) each have a 9-bit data length. The data of dx or dy is set in the lower bits of the 9-bit data format. The signs PX or PY are set in the most significant bit of the data format. Here, the sign indicates in which of the first to the fourth quadrants of the X-Y coordinate system the logical pel S lies. In this case, the display position of the logical pel S is at the origin of the coordinate system. In the example of FIG. 6, the logical pel S is in the first quadrant, and hence (PX) and (PY) are positive. Accordingly, in this example, the data representing a positive sign is set in the sign bit of each of the latch circuits 36 and 37. In the FIG. 2 circuit, the positive sign data is represented by "0", and the negative sign data is represented by "1".

Thus, the data representing a position of a display area of the logical pel S is set in the counters 34 and 35. The data representing a magnitude (containing a sign) of the display area of the logical pel S is set in the latch circuits 36 and 37.

It is sufficient to perform the setting of the data (PX, dx) and (PY, dy) to the latch circuits 37 and 36 and the setting of the drawing data into the latch circuit 19 during the reception of the PDI. If so, after the coordinates (Xo, Yo) are set in the counters 34 and 35, the write address data is automatically updated. According to the updating address, the drawing data is written into the buffer memory 11. Therefore, the MPU can start the decoding of the PDI of the subsequent logical pel.

When the coordinate value (Yo) is set in the counter 35, the pulse WT (FIG. 5) is used as the counting clock signal. This counter counts up or down the address of the vertical direction width, to update the address, as shown in FIG. 6.

To effect the up and down operations, the pulse WT is directed to the up terminal UCK and the down terminal DCK of the counter 35 by a data decoder 38. This direction of the pulse WT is controlled in the following manner. When the data of the sign bit Q8 of the latch circuit 36 is logical "0" (start of the address updating), the decoder 38 applies the pulse WT to the up terminal UCK of the counter 35. Upon receipt of this pulse, the output of the counter 35 is incremented one by one from the data address (Yo) at the trailing edge of the pulse (WT), as shown in FIG. 5. In this figure, $dY=3$ is illustrated as a typical example.

The pulse WT is further applied to a counter 39. The counter 39 is an 8-stage up-counter using the pulse WT as a counting clock. After this counter is reset by the pulse, which is formed by passing the pulse $L_4$ shown in FIG. 5 through an inverter 40 and an OR circuit 41, it counts up one by one at the trailing edge of the pulse WT, as shown in FIG. 5.

When the data from the counter 39 is coincident with the lower 8 bits data in the latch circuit 36, a coincidence detector 42 produces a coincident pulse $P_4$ as shown in FIG. 5. By supplying the pulse $P_4$ and the pulse WT to an AND circuit 43, a pulse $P_5$ as shown in FIG. 5 is obtained. This pulse $P_5$ is shifted by one count of the display clock CP by a D flip-flop 44 and is converted into a pulse $P_6$ (FIG. 5). By supplying this pulse $P_6$ and a pulse $P_7$ to an AND circuit 46, a pulse $P_8$ shown in FIG. 5 is obtained. The pulse $P_7$ (FIG. 5) is formed by passing the pulse $P_5$ through an inverter 45. The pulse $P_8$ is supplied to the reset input of counter 39 via OR circuit 41; therefore, the coincident pulse $P_4$ will follow.

The pulse $P_8$ is also supplied to a counter 47. This counter 47 is an 8-stage counter using the pulse $P_8$ for a counting clock. The counter 47, like the counter 39, is reset by the pulse which is formed by passing the pulse $L_4$ through the inverter 40 and the OR circuit 48, and the counter 47 then counts up one by one at the trailing edge of the pulse $P_8$. The data decoder 38 is used for directing the pulse WT to the up terminal UCK and the down terminal DCK of the counter 35 with the data in the least significant bit of the counter 47 being the data of the sign bit of the latch circuit 36. That is, the data in the least significant bit of the counter 47 and the data of the sign bit of the latch circuit 36 are both supplied to an exclusive OR circuit 49. At the initial stage of the address updating, the output of the least significant bit of the counter 47 is logical "0". Therefore, the output of the exclusive OR circuit 49 is determined by the data of the sign bit of the latch circuit 36. In this case, since the data of this sign bit is logical "0", the output of the exclusive OR circuit 49 is logical "0". When the exclusive OR circuit 49 has logical "0" at the output, the data decoder 38 supplies the pulse WT to the up terminal UCK of the counter 35. When the counter 35 updates the address of the vertical width dY and the pulse $P_8$ from the AND circuit 46 is obtained, the output of the least significant bit of the counter 47 which counts up is changed from logical "0" to logical "1". Then, the output of the exclusive OR circuit 49 is changed from logical "0" to logical "1". When the exclusive OR circuit 49 output is logical "1", the data decoder 38 supplies the pulse WT to the down terminal DCK of the counter 35. As a result, the counter 35 performs the down-counting. Subsequently, the output of the least significant bit of the counter 47 is inverted every time pulse $P_8$ is produced from the AND circuit 46. Then, the output of the exclusive OR circuit 49 is inverted to switch the counting direction of the counter 35.

After the counting direction of the counter 35 is switched, the address updating begins from the last address obtained before it is switched, as already stated referring to FIG. 6. This will be described in detail below.

The coincident pulse $P_4$ from the coincident detector 42 is inverted by an inverter 50 to disable an AND circuit 51. Then, at the time of switching the counting direction of the counter 35, the supplying of the pulse WT to the counter 35 is stopped to inhibit the output of the counter 35. As a result, the counter 35 restarts the address updating from the last address when the addresses are updated a predetermined number of times corresponding the vertical width dY. The pulse WT to the up terminal UCK and to the down terminal DCK of the counter 35 is shown in FIG. 5 by UCK(35) and DCK(35).

The control of the counter 34 is explained as follows.

Each time the counter 35 updates the addresses of the vertical width dY on one line, the pulse $P_8$ from the AND circuit 46 is directed to the up terminal UCK of the counter 34 and the down terminal DCK by the counter 34. When the sign bit $Q_8$ latched in the latched circuit 37 is logical "0", a data decoder 52 supplies the pulse $P_8$ to the up terminal UCK of the counter 34, thereby to cause the counter to count up. Conversely, when it is logical "1", the pulse $P_8$ is supplied to the down terminal DCK of the counter 34, thereby to cause the counter 34 to count down.

In this case, since the sign bit of the latch circuit 37 is logical "0", the counter 34 counts up one by one from the data (Xo), as shown in FIG. 5. In FIG. 5, the case of $dX=3$ is illustrated as a typical example.

The operation to obtain the end timing of the logical pel processing will now be given.

The counter 47 counts up one by one from "0" at the trailing edge of the pulse $P_8$, as shown in FIG. 5. During this operation, a coincidence detector 53 produces a pulse $P_9$ as shown in FIG. 5 when the count of the counter 47 is coincident with the lower 8 bits of data of the latch data in the latch circuit 37. An AND circuit 54 provides a pulse $P_{10}$ by logical ANDing the pulse $P_9$ and the pulse $P_5$ from the AND circuit 43. A combination of a D flip-flop 55, an inverter 56 and an AND circuit 57 produces a pulse $P_{13}$ with a width equal to one display clock pulse CP during the falling time of the pulse $P_{10}$, using the pulse $P_{10}$ and display clock CP. This is down in the same manner as for the combination of the D flip-flop 44, the inverter 45 and the AND circuit 46 which forms the pulse $P_8$ falling at the leading edge of the pulse $P_5$ using the pulse $P_5$ and the display clock CP. The output pulses $P_{11}$ and $P_{12}$ of the D flip-flop 55 and the inverter 56 are illustrated in FIG. 5.

At the leading edge of the pulse $P_{13}$, the D flip-flops 25 and 26 and the counters are reset. As a result, the generation of the pulse WT and the data write pulse WP are ended, thereby ending the write address updating and the data write operation. The pulse $P_5$ is produced when all of the vertical direction addresses are updated. The pulse $P_9$ is produced when all of the horizontal direction addresses are updated. Therefore, when the pulse $P_{13}$ is produced from the pulses $P_5$ and $P_9$ to reset the flip-flops 25 and 26 for data writing, all of the addresses of the logical pel S are updated.

Figure 10:
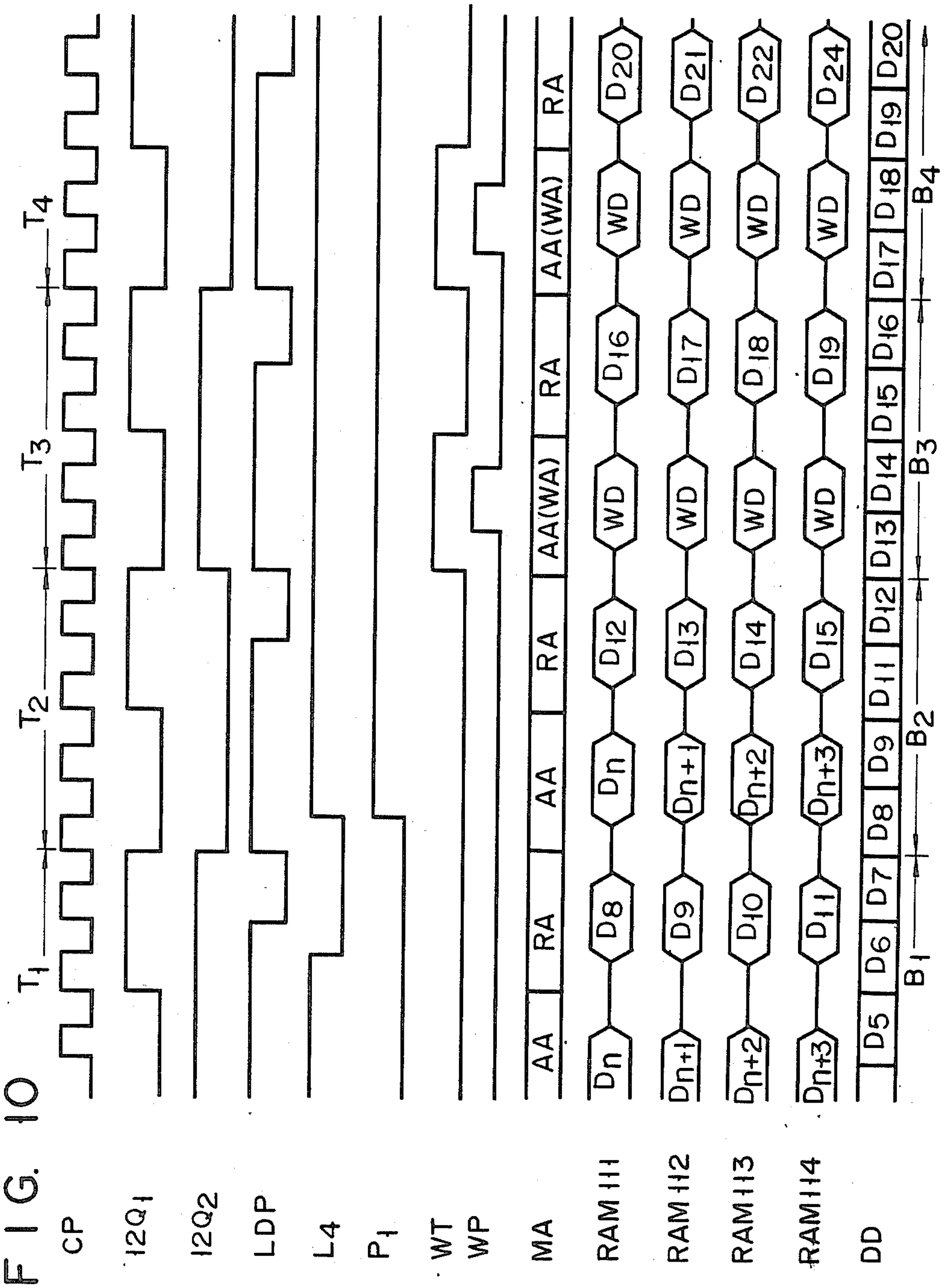
FIG. 10 shows a timing chart for illustrating the data write operation of the FIG. 1 circuit.
Figure 11:
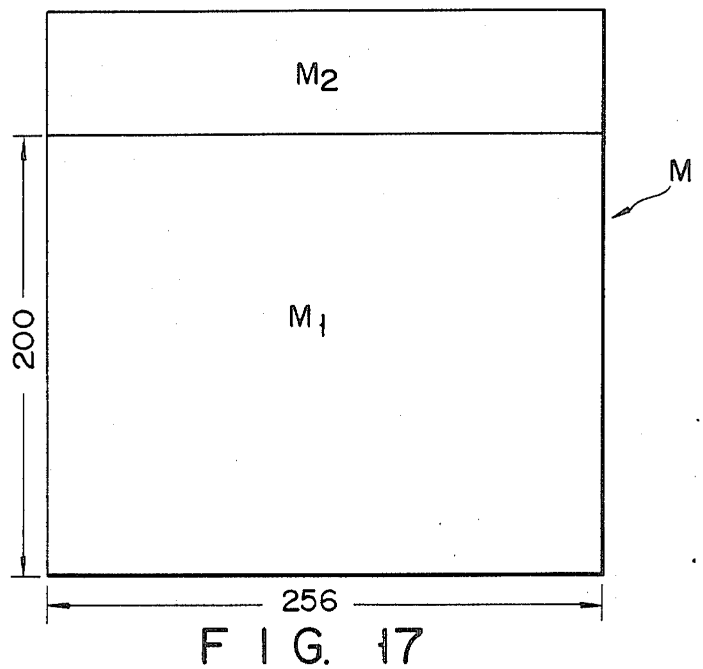
FIG. 11 shows a view useful in explaining a memory space in an image memory in the FIG. 1 circuit.

FIG. 10 shows a timing chart illustrating the relationship between the display data read out processing and the logical pel processing. In the figure, there are illustrated the output of the counter 12, the input/output data of RAMs 11R to 14R, and the output DD of parallel/serial converters 151 to 154. WD designates the drawing data loaded into RAMs 11R to 14R. The drawing data is actually loaded into only the RAM to which the data write permission pulse is applied. Dn to Dn+3 is the output data outputted from RAMs 11R to 14R in other modes than the logical pel processing mode and is not fixed (this is correspondingly applied to FIG. 4). A value of Dn to DN+3 is determined by output states of counters 34 and 35. As shown, the logical pel processing is performed in the first half of each display period Tm, and the display data read out processing is performed in the second half period.

The coordinate values (Xo, Yo) representing the start point of the logical pel S are not preset to the counters 34 and 34 directly, for they are set to the counters 34 and 35 through adders 60 and 61 as shown in FIG. 2. The adder 60 adds together the coordinate value Xo as an augend and a sign PX as an addend. In this case, the sign PX is supplied to all of the addition input terminals. Similarly, the adder 61 adds together the coordinate value Yo as an augend and a sign PY as an addend when the signs PX and PY take negative values, and the values actually preset in the counters 34 and 35 are the result obtained by subtracting 1 from the coordinate value on the data bus DB.

Thus, the present system can automatically correct the starting point of the drawing data according to polarities of signs PX and PY. As shown in FIG. 6, if the coordinate values (Xo, Yo) on the data bus DB are not corrected, the starting point (S1) is fixed in spite of the polarity of PX and PY. In this case, at least one dot area (=S1) is overlapped. However, this invention can correct the starting point to be S1, S2, S3 or S4 as in FIG. 6. When the polarity of signs PX and PY are negative, the starting point is selected to be S3, because the drawing area expands to the left and down direction of FIG. 6. When the sign PX is positive and the sign PY is negative, the starting point is selected to be S4, because the drawing area expands to the left and up direction of FIG. 6. Thus, the apparatus of this invention effectively controls the starting point of the drawing.

Figure 7:
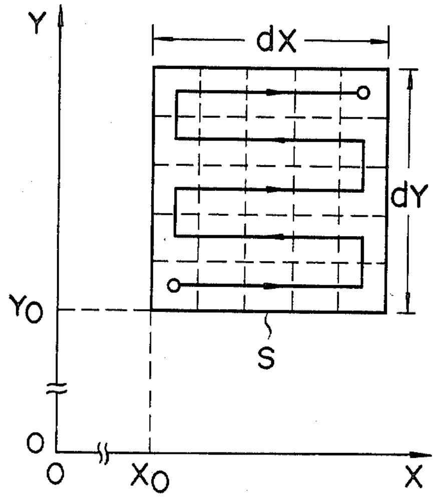
Figure 8:
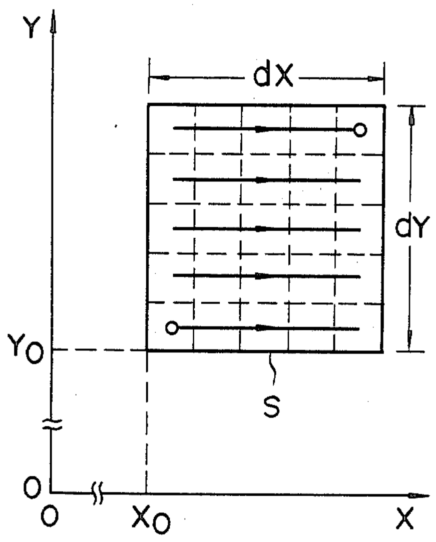
Figure 9:
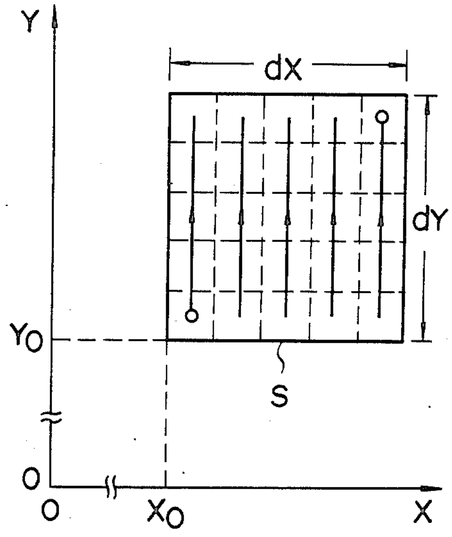

In the above-mentioned embodiment, the write address data of the logical pels are updated in a zigzag pattern, as shown in FIG. 6. Alternately, the addresses may be updated in a zigzag pattern as shown in FIG. 7, or unidirectionally as shown in FIGS. 8 and 9. Also, in these cases, the present invention may be embodied by substantially the same configuration as the one described with reference to FIG. 6.

Processing for prohibiting the logical pels from being written into memory areas other than a desired memory area of the buffer memory (this processing called a clipping process) will now be described.

A memory space M of the buffer memory 11 shown in FIG. 2 actually consists of a memory space M1 corresponding to the image display area A (FIG. 3) and a memory space M2 corresponding to a nonimage display area. Normally, the drawing data is written into only the memory space M1. The memory space M2 is used for storing drawing data for displaying elements such as characters inputted by an input key of the receiving terminal and is not used for displaying the received image data.

The clipping process will be described referring to FIG. 2

One bit of data of 0 or 1 on the data bus DB is supplied to a D flip-flop 62 according to a load pulse $L_6$ outputted from the MPU. When one bit of data of 0 is set in the D flip-flop 62, the drawing data is loaded into the memory space M1 corresponding to the image display area A. In the memory space M2 corresponding to the nonimage display area, a clipping process prohibits the writing of the drawing data (herein after called a first clipping mode). When one bit of data of 1 is set in the D flip-flop 62, on the other hand, the clipping process is executed in the memory space M1 to set up a clipping mode (this mode will be called a second clipping mode) to allow the drawing data to be written in the memory space M2.

The Q output of the D flip-flop 62 is supplied to a two input AND circuit 69. The $\bar{Q}$ output of the flip-flop 69 is inputted to a two input AND circuit 70. The outputs of these AND circuits 69 and 70 are applied to an OR circuit 71. When the outputs of the circuits 69 and 70 are both 0, the output of the OR circuit 71 is also 0. Therefore, in the AND circuit 30, the pulse WT is stopped, and the producing of the data write pulse WP is stopped also. As a result, the write permission pulses WEP1 to WEP4 are not produced from the data decoder 33, and the writing of the drawing data into the buffer memory 11 is prohibited.

The inputs to an AND circuit 64 are the sixth stage output $Q_5$ and the seventh stage output $Q_6$ of the counter 35. The inputs of the OR circuit 65 are the third stage output $Q_2$ to the fifth stage output $Q_4$ of the counter 35. The outputs of the AND circuit 64 and the OR circuit 65 are supplied to an AND circuit 66. Therefore, if the sixth stage output $Q_5$ and the seventh stage output $Q_6$ are both 1 and if any one of the third stage outputs $Q_2$ to the fifth stage output $Q_4$ is 1, then the output of the AND circuit 66 is 1. That is to say, when the count of the counter 35 is "11001000" or more in a binary number or 200 or more in a decimal number, the output of the AND circuit 66 is 1.

The inputs of the OR circuit 63 are the ninth stage outputs $Q_8$ of the counters 34 and 35 (the most significant bit outputs of the counters 34 and 35). The output of the OR circuit 63 and the output of the AND circuit 66 are inputted to a NOR circuit 67. The output of the NOR circuit 67 is supplied to the AND circuit 70 and to an AND circuit 69 via an inverter 68. The OR circuit 63 produced 1 when the most significant bits of the counters 34 (or 35) are set to 1. In this case, the counters 34 and 35 each have an ability to count from 0 to 256. The output of the OR circuit serves as a flag representing an overflow or an underflow of each counter 34 and 35.

Thus, the output of the AND circuit 66 is 1 when the count of the counter 35 is 200 or more. The output of the OR circuit 63 is 1 when either one or both of the outputs of the counters 34 and 35 is the overflow or the underflow. Therefore, when the write address data outputted from the counters 34 and 35 are both specifying the memory space M1, the output of the NOR circuit 67 is 1. On the other hand, when the write address data outputted from the counters 34 and 35 are those in a memory space (the memory space M2 or a memory space other than the memory space M), either one or both of the outputs of the AND circuit 66 and the OR circuit 63 are 1, and then the output of the NOR circuit 67 is 0.

The following table shows that the outputs of the AND circuits 69 and 70 depend on the outputs of the NOR circuit 67 and the D flip-flop 62 holding the data of a memory space to be clipped.

TABLE

| | Q output of D flip-flop 62 | |
|---|---|---|
| Output of NOR 67 | 0 (1st clipping mode) | 1 (2nd clipping mode) |
| 1 Write address data is within memory space M1 | Output of AND 70 is 1. | Outputs of ANDs 69, 70 are 0. |
| 0 Write address data is outside memory space M1 | Outputs of ANDs 69, 70 are 0. | Outputs of ANDs 69, 70 are 1. |

As shown from this table, when the Q output of the D flip-flop 62 is 0 (in the first clipping mode allowing the data write in the memory space $M_1$), if the write address data is updating the address in the memory space $M_1$, the output of th NOR circuit 67 is 1, and therefore the output of the AND circuit 70 is 1. When the Q output of the D flip-flop 62 is 1 (in the second clipping mode allowing the data to be written in the memory space $M_2$), if the write address data is any other address than that in the memory space $M_1$, the output of the NOR circuit 67 is 0, and hence the output of the AND circuit 69 is 0. On the other hand, when the Q output of the D flip-flop 62 is 0, and the output of the NOR circuit 67 is 0, or if the Q output of the D flip-flop 62 is 1, and the output of the NOR circuit 67 is 1, the outputs of the AND circuits 69 and 70 are both 0.

The construction consisting of the invertor 68, AND circuits 69, 70 and the OR circuit 71 may be replaced by an exclusive OR circuit.

When either one of the outputs of the AND circuits 69 and 70 is 1, the output of the OR circuit 71 becomes, thereby enabling the AND circuit 30 for producing the write pulse WP. However, when the ouput of the OR circuit 71 is 0, the pulse WT is not produced. Thus, if the write address data is an address other than that in the memory space M1 in the first clipping mode, or if it is the address in the memory space M1 in the second clipping mode, the drawing data writing into the buffer memory 11 is prohibited.

Figure 12:
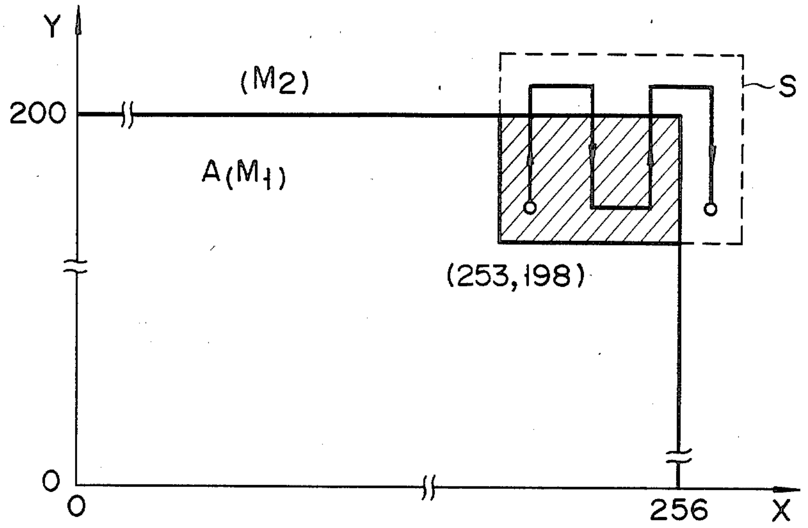
FIG. 12 shows a view useful in explaining a clipping procesing function of the FIG. 1 circuit.
Figure 13:
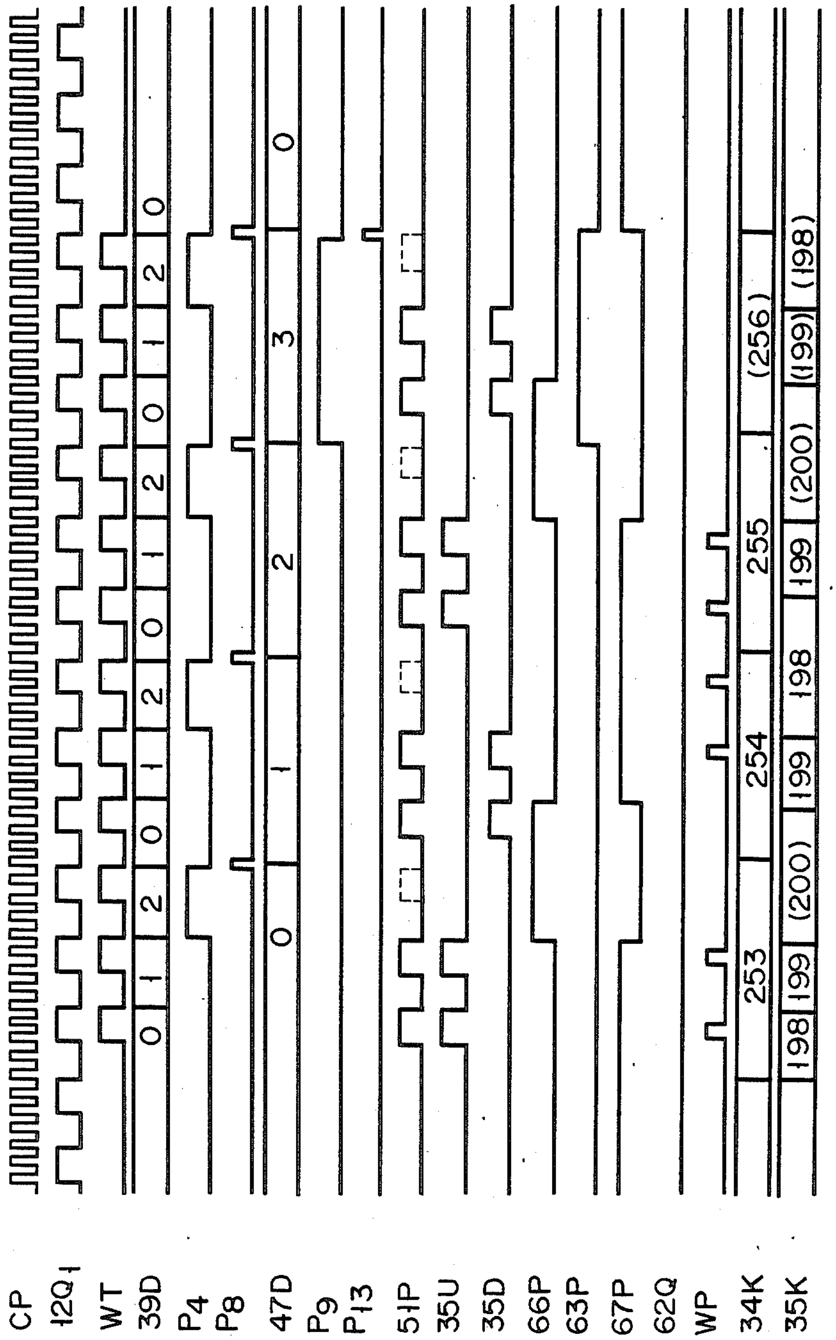
FIG. 13 shows a timing chart for illustrating the clipping processing function of the FIG. 1 circuit.

The above operations will further be explained in more detail referring to FIGS. 2, 12 and 13.

In FIG. 12, there is illustrated a case in which a logical pel S having the X- and Y-axes width dX=4 (dx=3) and dY=3 (dy=2) is to be written in the first clipping mode in which the coordinates (Xo, Yo) of the start point are (253, 198).

In FIG. 13, when the count value 39D of the counter 39 is coincident with the vertical width dy latched in the latch circuit 36, the AND circuit 46 produces a pulse P8 to reset the counter 39 and to cause the counter 47 to count up. When the count 47D of the counter 47 is coincident with the data dx in the latch circuit 37, the pulse $P_{13}$ is produced to stop the generation of the pulse WT. Then, the data writing of one logical pel S is completed. In the timing chart, 51P indicates a waveform of the output signal from the AND circuit 51. 35U indicates a waveform of a clock signal applied to the up terminal UCK of the counter 35. 35D indicates a waveform of a clock applied to the down terminal DCK of the counter 35. By these clocks, the count value 35K of the counter 35 changes as shown in FIG. 13. In the counter 34, the pulse $P_8$ is supplied to only its up terminal UCK. Then, the count output 34K of the counter 34 changes as shown in FIG. 13.

The count value 35K of the counter 35 increases as shown by a rectangular line in FIG. 12 or by the values in FIG. 13. When it reaches 200, the outputs of the AND circuit 64 and the OR circuit 65 shown FIG. 2 are both 1, and the output 66P of the AND circuit 66 is 1. This is illustrated in FIG. 13. The count value 34K of the counter 34, also increases as shown in FIG. 12 or 13. When the count reaches 256, the ninth stage output $Q_8$ of the counter 34 is 1, and the output 63P of the OR circuit 63 is 1. This is illustrated in FIG. 13. Therefore, the output 67P of the NOR circuit 67 takes a waveform as shown in FIG. 13. Since the Q output 62Q of the D flip-flop 62 is now 0, as shown in FIG. 13, the write pulse WP is interrupted when the count of the counter 35 is 200 or the count of the counter 34 is 256, as shown in FIG. 13. Through such a sequence of shaded operations, the logical pel is written into only the shaded portion in FIG. 12.

Figure 14:
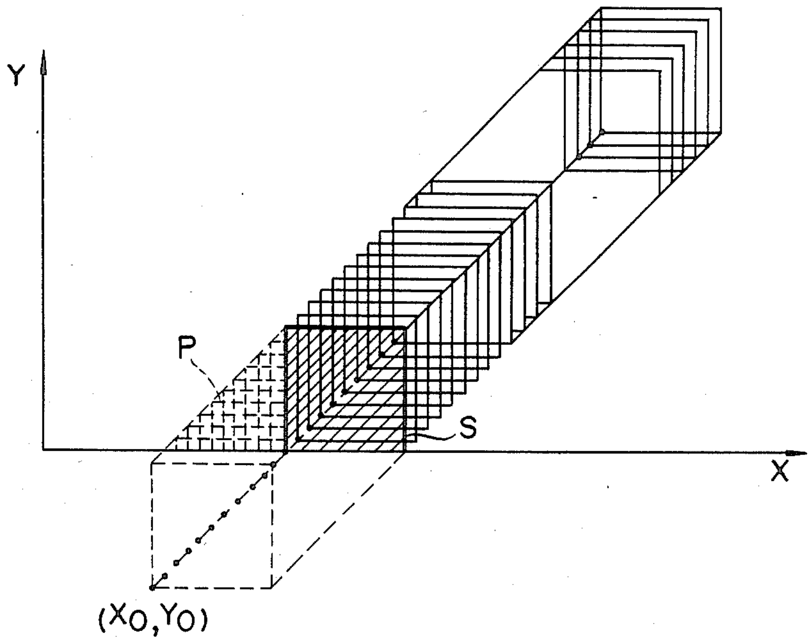
FIG. 14 shows a view illustrating the clipping processing function of the FIG. 1 circuit.

As described above, the memory control apparatus according to the present invention has a clipping processing function. Using this function, data can be written into a desired memory space. Generally, the buffer memory 11 has a memory space larger than it covers for the image display area; accordingly, the memory space not being used for the image display area may be used as a memory space to store display characters inputted by the key input. In this case, it must be prohibited to write data into the image display area. If the above clipping processing is performed by the MPU it is necessary to detect whether a part or all of the logical pel exists outside the image display area to stop the data writing. If the writing of the logical pel is merely stopped at a drawing point, for a straight line continuously extending outside the image display area as shown in FIG. 14, it is impossible to write a triangle portion P which must be written. This is so because for the write processing of the triangle portion P, if the MPU corrects the size of the logical pel or decides whether the address data is within the image display area, the data processing load of the MPU is very large. However, since the memory control apparatus of the present invention has the clipping processing function as described referring to FIGS. 2, 12 and 13, an automatic data write processing by hardware may be applied to the triangle portion P.

Figure 15:
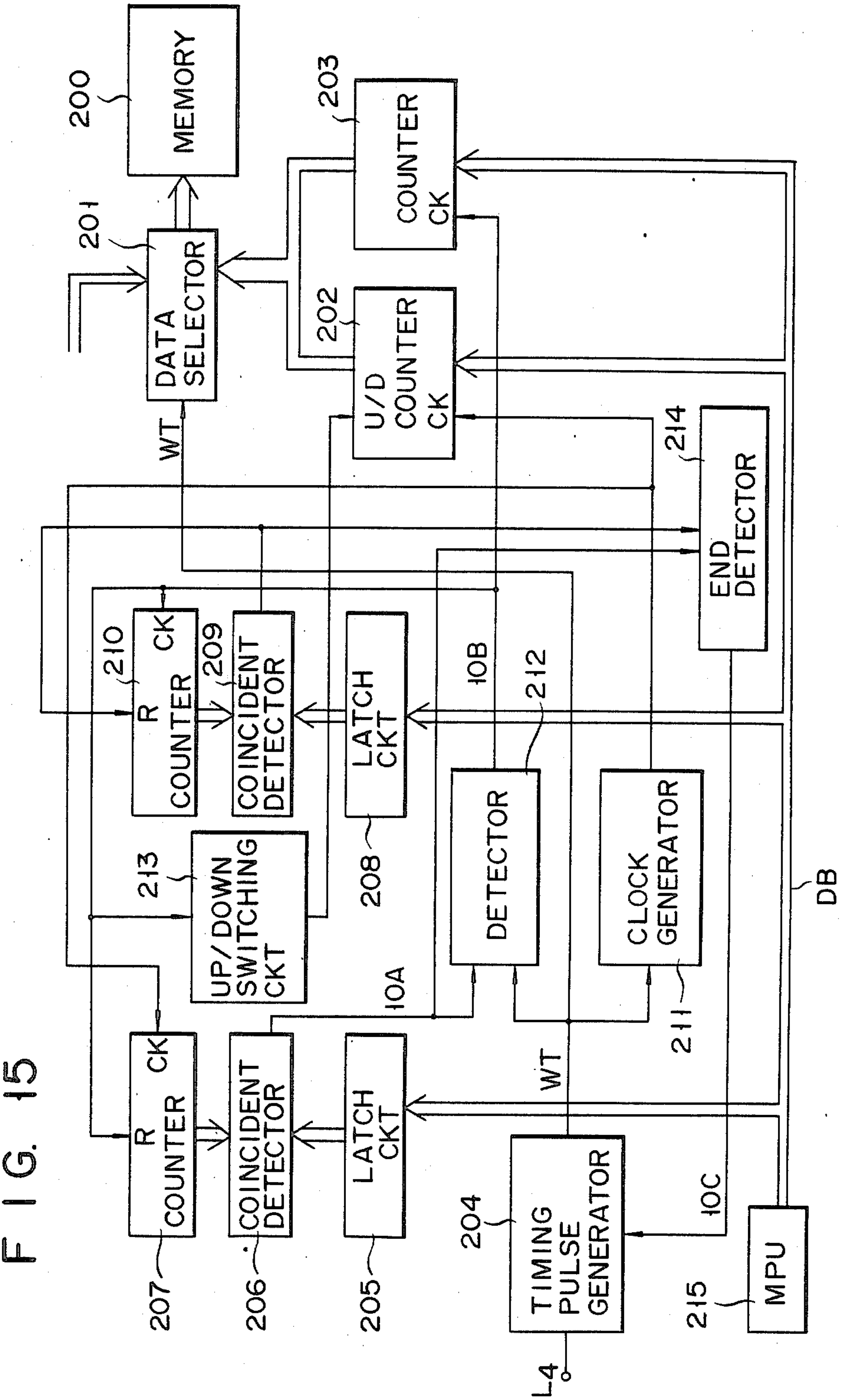
FIG. 15 is a block diagram of a second embodiment of the present invention.

FIG. 15 shows another embodiment of the present invention.

In the FIG. 15 apparatus, a data selector 201 supplies the address data to a memory 200. The data selector 201 in response to the write timing pulse WT selects the output of a first and a second presettable up/down counter 202 and 203. The outputs of counter 202 and 203 are vertical and horizontal direction address data, and their outputs are supplied to the buffer memory 200. A write timing pulse generator 204 generates the write timing pulse WT when receiving a load pulse $L_4$.

Start point coordinate data is applied from the MPU 215 to the presettable up/down counter 202 and 203 through a data bus DB. The data representing the vertical width dY and the horizontal width dX of a logical pel are set in first and second latch circuits 205 and 208 through the data bus DB. Data representing dx(dX−1) and dy(dY−1) are set as in the FIG. 1 embodiment. When the write timing pulse WT is generated, the outputs of the presettable up/down counter 202 and 203 are applied to the memory 200.

A clock signal from a clock generator 211 is supplied to the counter 202 and a first counter 207. Then, the address data in the Y-axis direction is updated. Thus, every time the write timing pulse WT is inputted, the address is updated. When the contents of the first counter 207 are coincident with contents of the latch circuit 205, the coincidence detector 206 produces a coincident pulse 10A. When the coincident pulse 10A and the write timing pulse WT are both supplied to a detector 212, a direction switch pulse 10B is produced. The direction switch pulse 10B is applied as a clock pulse to the clock input terminal of the counter 203 and to a second counter 210. Then, the first counter 207 is reset. Further, the direction switch pulse 10B is detected by an up/down switching circuit 213 to switch the count direction of the counter 202. Accordingly, when the write timing pulse WT is generated, the count direction of the counter 202 is reversed. At this time, however, the row of the write address has been changed by the counter 203. Repeating such operation, the first and second coincidence detectors 206 and 209 produce coincidence detecting pulses concurrently. This is detected by an end detector 214 which then produces a detection pulse 10C to set the write timing pulse generator 204 in a waiting mode.

As described above, according to the present invention, when the logical pel data representing the thickness of a drawing image and its coordinate data are transmitted, the MPU sets these pieces of data into the register only one time. Then, the hardware of this system automatically updates the address of one pel of data and performs the data write according to the logical pel data. Therefore, the memory control apparatus of the invention can write the data at a higher speed than the conventional data writing in which the coordinate values are detected for each pel by a program. Further, a significant amount of data processing time of the MPU can be saved.

Figure 16:
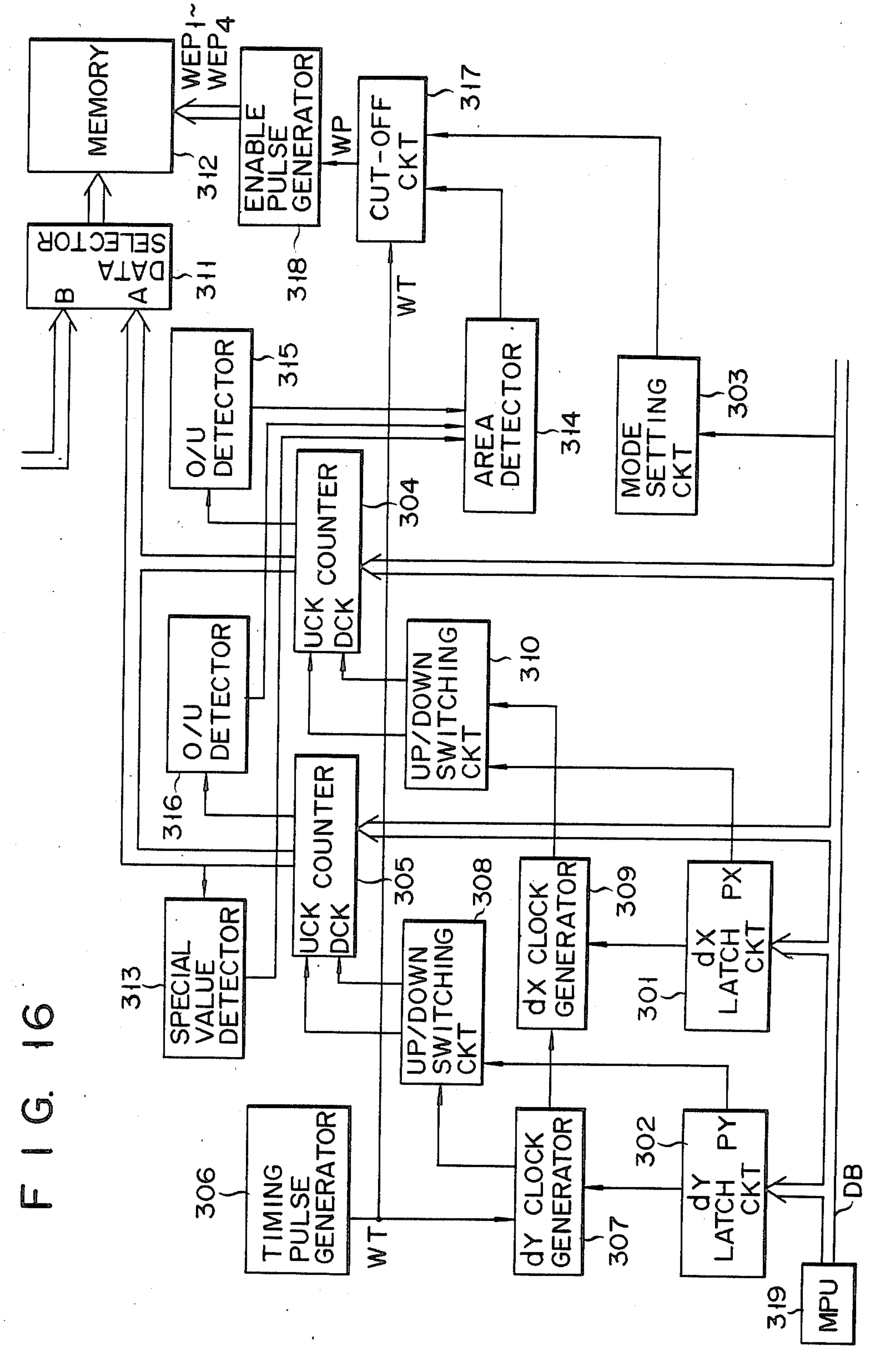
FIG. 16 is a block diagram of a third embodiment of the present invention.

FIG. 16 shows a memory control apparatus with an improved clipping process for another embodiment of the present invention.

In FIG. 16, the vertical width dY and horizontal width dX of a logical pel S are latched in latch circuits 301 and 302. The mode specifying data is stored in a mode setting circuit 303 for setting the first or the second clipping mode. The coordinates (Xo, Yo) representing a start point of the logical pel S are set by counters 304 and 305 and the counters 304 and 305 generate the write address for the horizontal and vertical directions, respectively. The coordinates (Xo, Yo) are supplied from an MPU 319.

A write timing pulse WT as a reference pulse for data writing is generated from a timing pulse generator 306. Using the write pulse WT, a dY clock generator 307 generates a number of clock pulses corresponding to the vertical width dY and supplies them to an up/down switching circuit 308. The up/down switching circuit 308 selectively supplies the clock pulses to the up terminal UCK and the down terminal DCK of the counter 305, thereby updating the vertical direction write address data. A dx clock generator 309 produces one clock pulse each time it receives a number of clock pulses corresponding to the vertical width dY from the dY clock generator 307, and an up/down switching circuit 310 selectively supplies the signal from the dX clock generator 309 to the up terminal UCK or the down-terminal DCK of the counter 304 according to a sign PX from the latch circuit 301.

With such an arrangement, the write address data is updated to a zigzag pattern, as shown in FIG. 6, and is supplied to a data selector 311. The data selector 311 then supplies the address data to a buffer memory 312, during the data writing period.

When the vertical write address is 200 or more, for example, the special value detector 313 detects this value and applies it to an area detector 314. When an overflow (256 or larger) or an underflow (0 or smaller) occurs in the counter 304 or 305, overflow/underflow (O/U) detector circuits 315 and 316 also supply the data on the overflow or underflow to the area detector 314. The area detector 314 detects whether the write address is within the memory space $M_1$ from the information indicating the overflow or the underflow which is derived in the O/U detectors 315, 316.

The cut-off circuit 317 performs the following operation according to the detected output from the area detector 314 and the mode as set in the mode setting circuit 303.

In the first clipping mode for writing the drawing data into the memory space $M_1$, only when the write address is within the memory space $M_1$ is the write pulse WP supplied to pulse generator 318. On the other hand, when write address is outside the memory space $M_1$, generation of the write pulse WP is prohibited. For writing the drawing data into the memory space $M_2$, only when the write address is within the memory space $M_1$ is generation of the write pulse WP prohibited. In other cases, the generation of the data write pulse WP is allowed.

Through these operations, in the first clipping mode for writing the drawing data into the memory space $M_1$, the counter 305 updates the write address in a zigzag pattern according to the size of the logical pel S. If the address is outside the memory space $M_1$, the write pulse WT is inhibited. Accordingly, the write permission pulses WEP1 to WEP4 are not produced from the enable pulse generator 318, and the drawing data is not written into the buffer memory 312. As a result, the automatic writing of the logical pel S and the clipping process outside the memory space $M_1$ are performed. In the mode for writing the drawing data into the memory space $M_2$, the operation is reverse to the above.

In this embodiment, the writing of the logical pel and the clipping process are automatically performed after the MPU provides the clipping data in the mode setting circuit 303 (corresponding to the D flip-flop 62 in FIG. 2), the size (dx, dy) and the signs (PX, PY) of the logical pel S are inputted into the latch circuits 301 and 302, and the coordinates (Xo, Yo) of the start point of the logical pel S are inputted into the counters 304 and 305 (counters 34 and 35 in FIG. 2). Therefore, there is no need for checking by the MPU whether the logical pel S may be set within the image display area A or the nonimage display area. The processing work of the MPU is thereby remarkably reduced, and the data writing speed is considerably improved. Further, there never occurs a case that the logical pel S extends outside the image display area A of the buffer memory 312, and a part of the logical pel S is not written into the image display area A located opposite to its area because of the continuity of the address.

If the portion of the logical pel S outside the image display area A is always clipped, when the characters from a keyboard are input, the key input data is not written into the nonimage display area. However, in this invention two modes can be used to specify a memory area to be used. This approach enables the nonimage display area to be used as a buffer. Further, this approach is free from the problem that the character data extends into the image display area A.

Figure 17:
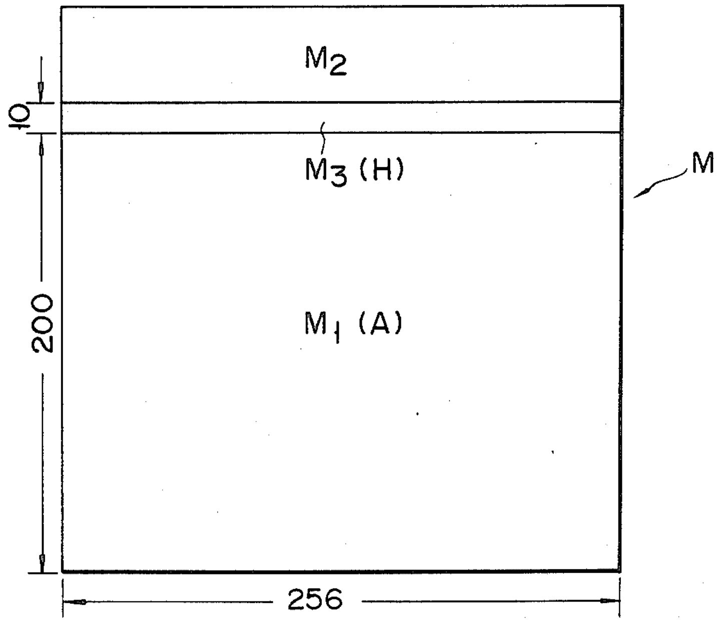
FIG. 17 shows a view illustrating another memory space of the image memory.

As shown in FIG. 17, the NAPLPS has an image display area H of about 10 dots width as a message area in addition to the image display area A for drawing. In this case, addresses for memory space $M_1$ for the image display area A and the memory space $M_3$ for the image display area H are continuous in the buffer memory. One bit of image data for the memory space M1 shall not be written into the memory space M2 or vice-versa. This invention can be effectively realized to eliminate the problem that invasion of the logical pel S does not extend to the other display area, for by switching between modes, data can be written into either one of the display areas.

In the above-mentioned embodiments, the write address data of the logical pel S is updated in a zigzag pattern, as shown in FIG. 6. The memory control apparatus, however, is operable in updating directions as shown in FIGS. 7 to 9 without difficulty. The size of the area (memory space) for the data writing or the clipping can properly be selected.

Figure 18:
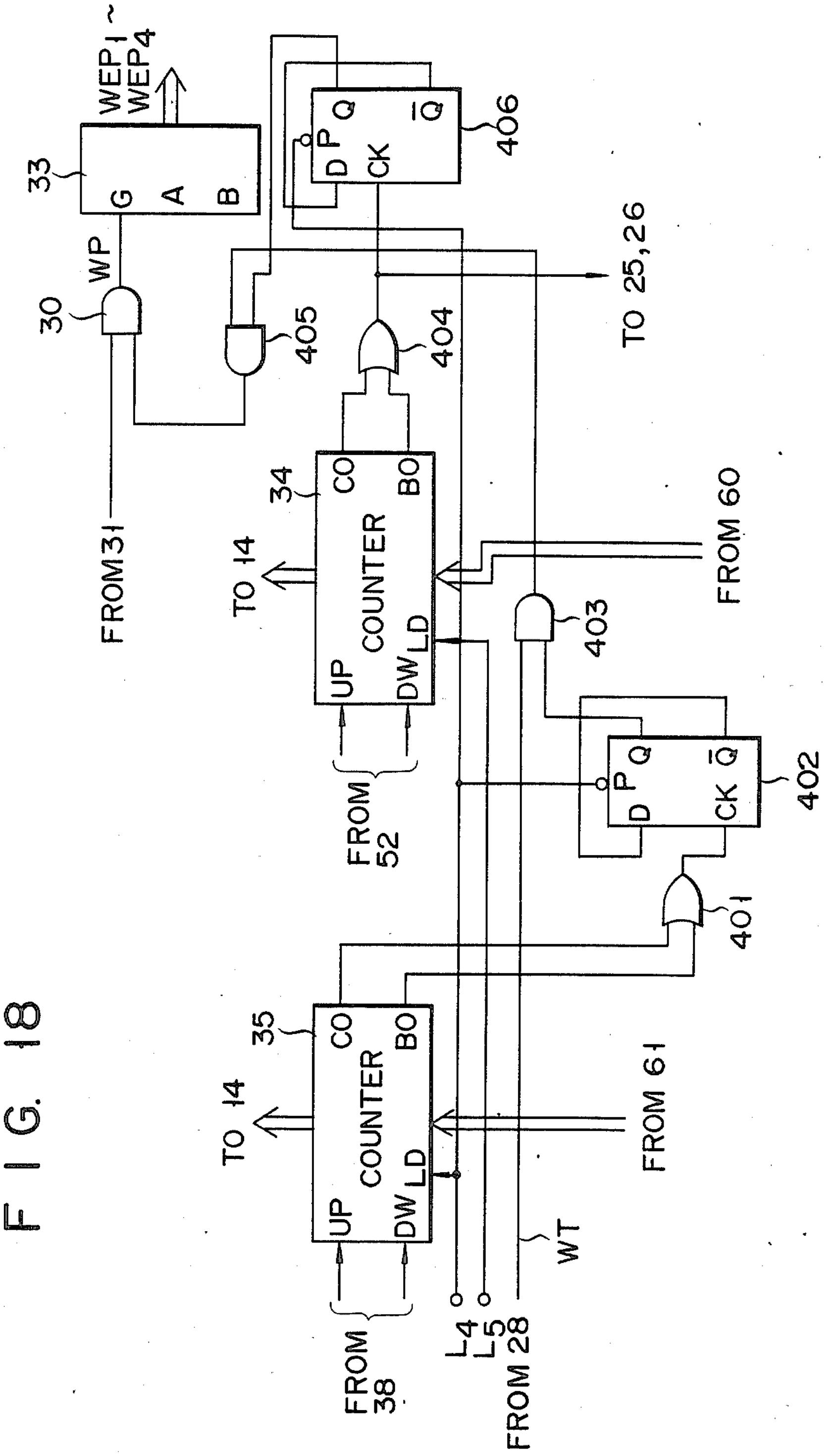
FIG. 18 shows a circuit diagram of another embodiment of a clipping processing circuit according to the present invention.

The clipping process function may also be realized by an arrangement as shown in FIG. 18. In the figure, like reference symbols are used for designating like portions in FIG. 2. The arrangement of this embodiment is more simplified and is effective particularly when the address area given by the outputs of the counters 34 and 35 are coincident with the display area.

In FIG. 18, a borrow output Bo and a carry output Co from the counter 35 are applied through an OR circuit 401 to the clock input terminal of a D type flip-flop 402 to control the gating of an AND circuit 403. According to such a circuit arrangement, the address is updated in the vertical direction and passes the border line of the display area in the vertical direction. When the counter 35 is overflowed (or underflowed), a carry output Co (or a borrow output Bo) is produced. Then, the Q output of the D type flip-flop 402 changes from logical "1" to logical "0" and disables the AND circuit 403. As a result, the AND gates 405 and 30 are disabled, the supply of the write permission pulses WEP1 to WEP4 to the buffer memory 11 is stopped, and the data writing is prohibited. At this time, the counters 34 and 35 continue the address updating in a usual manner. Accordingly, by address updating with the counter 35, the vertical direction write address returns to the display area, and the counter 35 produces a borrow output Bo or a carry output Co. Therefore, the Q output of the D type flip-flop 402 returns to "1" in logic level. The supply of the write permission pulses WEP1 to WEP4 is restarted, and data writing is restarted.

The carry output Co and the borrow output Bo of the counter 34 are similarly applied to a D type flip-flop 406 through an OR circuit 404. The output of the D type flip-flop 406 is supplied to the AND gate 405. Thus, when the address is updated in the vertical direction and passes the boundary line of the horizontal direction display area, the counter 34 is overflowed or underflowed and provides a carry output Co or a borrow output Bo. As a result, the supply of the write permission pulses WEP1 to WEP4 to the buffer memory 11 is stopped to prohibit the data writing. The output of the OR circuit 404 at this time may also be used as a write end signal of the logical pel.

What is claimed is:

1. A memory control apparatus for a CRT controller comprising:

a buffer memory including a plurality of X and Y addresses which are each designated by address data, said X and Y addresses respectively defining horizontal and vertical positions in X and Y coordinates on a CRT screen;

a data input circuit for supplying drawing data to said buffer memory;

write pulse generating means for producing a write pulse for enabling said buffer memory to store said drawing data; and means for updating said address data, including:

(a) initial means for producing initial X and Y addresses Xo and Yo, respectively, which represent initial values of respective X and Y addresses;

(b) X address updating means, initialized by said initial means, for updating the initial X address while the Y address is fixed;

(c) Y address updating means, initialized by said initial means, for updating the initial Y address while the X address is fixed;

(d) register means for storing X width data dX and Y width data dY and for defining changes in the X and Y addresses by said X and Y address updating means; and (e) means, connected to said X address updating means and said Y address updating means, for causing said X and Y address updating means to update the X and Y addresses repeatedly for the number of times defined by the X width data dX and the Y width data dY to form an updated X address equalling Xo+dX and an updated Y address equalling Yo+dY.

2. A memory control apparatus for a CRT controller according to claim 1, wherein said updating means comprises write prohibiting means which stops the write pulse generated by said write pulse generating means from enabling said buffer memory so as to prohibit writing of the drawing data into said buffer memory when said updated X and Y addresses reach addresses corresponding to a non-display area of the CRT screen.

3. A memory control apparatus for a CRT controller according to claim 2, wherein said write prohibiting means comprises:

area identifying means, connected to said address updating means, for obtaining area identifying signals which identify the updated X and Y addresses from said address updating means as addressing certain ones of a plurality of areas in said buffer memory; and area specifying means, connected to said area identifying means and said buffer memory, for storing area specifying data specifying an area into which drawing data is to be written, for obtaining a write prohibiting signal when the area identifying signals are not coincident with said area specifying data, and for stopping the write pulse to said buffer memory when said write prohibiting signal is obtained.

4. A memory control apparatus for a CRT controller according to claim 3, wherein said area identifying means includes an area detector for decoding said updated X and Y address data.

5. A memory control apparatus for a CRT controller according to claim 3, wherein said area specifying means includes mode select means for latching said area specifying data and decision means connected to said mode select meeans and said area identifying means for stopping the write pulse when said area specifying signals identifying the updated X and Y addresses are not coincident with said area specifying data.

6. A memory control apparatus for a CRT controller according to claim 1, wherein said address updating means comprises:

first address generating means for generating the updated Y address;

second address generating means for generating the updated X address;

first register means for latching a first width representing the width dX;

second register means for latching a second width representing the width dY;

a first comparator, connected to said first register means and a first counter, for obtaining a first coincident pulse when the output signals of said first register means and said first counter are coincident with each other;

a second comparator, connected to said second register means and a second counter, for obtaining a second coincident pulse when the output signals of said second register means and said second counter are coincident with each other;

a Y-axis pulse generator for supplying a clock pulse to said first address generating means in response to a write start pulse;

an X-axis pulse generator for supplying a clock pulse to said second address generating means in response to said first coincident pulse; and end detecting means connected to said first and second comparators for stopping an output of said write start pulse when said first and second comparators produce said first and second coincident pulses simultaneously.

7. A memory control apparatus for a CRT controller according to claim 1, wherein said address updating means comprises:

a first presettable up/down counter for generating the updated Y address;

a second presettable up/down counter for generating the updated X address;

a first latch circuit for latching a first width representing the width dY;

a second latch circuit for latching a second width representing the width dX;

a first signal-coincidence detector, connected to said first latch circuit and a first counter, for obtaining a first signal-coincidence pulse when the output signals of said first latch circuit and said first counter are coincident with each other;

a second signal-coincidence detector, connected to said second latch circuit and a second counter, for obtaining a second signal-coincidence pulse when the output signals of said second latch circuit and said second counter are coincident with each other;

a clock generator for supplying a clock pulse to said first presettable up/down counter and said first counter when a write start pulse is produced;

detecting means for supplying a clock pulse to said second presettable up/down counter and said second counter and for supplying a reset pulse to said first counter when said detecting mans receives said write start pulse and said first signal-coincidence pulse;

an up/down switch circuit, connected to said detecting means and said first presettable up/down counter, for switching the counting direction of said first presettable up/down counter in response to said reset pulse; and an end detector, connected to said first and second signal-coincidence detectors, for stopping an output pulse of said write pulse generating means when said first and second signal-coincidence detectors produce said first and second signal-coincidence pulses simultaneously.

8. A memory control apparatus for a CRT controller according to claim 1, wherein said write pulse generating means is triggered by a start pulse from said initial means and uses as a clock signal the output pulse from a read address generator which generates addresses of said buffer memory in which data is to be read.

9. A memory control apparatus for a CRT controller according to claim 1, wherein said address updating means comprises:

first and second presettable up/down counters for producing said updated X and Y addresses;

a first adder for adding said initial address Xo and a sign bit of said X width data dX, wherein the output of said first adder is inputted into said first presettable up/down counter; and a second adder for adding said initial address Yo and a sign bit of said Y width data dY, wherein the output of said second adder is inputted into to said second presettable up/down counter.

10. A memory control apparatus for a CRT controller according to claim 9, further comprising:

a first OR circuit supplied with a carry output and a borrow output of said first presettable up/down counter;

a first flip-flop circuit, connected at a clock terminal to an output terminal of said first OR circuit, for obtaining an inverted and a non-inverted output signal in response to an output pulse of said first OR circuit;

a second OR circuit supplied with a carry output and a borrow output of said second presettable up/-down counter;

a second flip-flop circuit, connected at a clock terminal to an output terminal of said second OR circuit, for obtaining an inverted and a non-inverted output signal in response to an output pulse of said second OR circuit; and AND circuit means provided on a write pulse input line of said buffer memory for permitting or prohibiting the passing of said write pulse in response to outputs of said first and second flip-flop circuits.

11. A memory control apparatus for a CRT controller comprising:

a buffer memory including a plurality of X and Y addresses which are each designated by address data, said X and Y addresses respectively defining horizontal and vertical positions in X and Y coordinates on a CRT screen;

a data input circuit for supplying drawing data to said buffer memory;

write pulse generating means for producing a write pulse which enables said buffer memory to store said drawing data; and means for updating said address data, including:

(a) initial means for producing initial X and Y addresses Xo and Yo, respectively, which represent initial values of respective X and Y addresses;

(b) address updating means, initialized by said initial means, for updating either the initial X or Y address;

(c) register means for storing X and Y width data dX and dY, respectively, and for defining changes in the X or Y address updated by said address updating means;

(d) means, connected to said address updating means, for causing said address updating means to update the X or Y address repeatedly for the number of times defined by the dX or dY; and (e) write prohibiting means for stopping the write pulse generated by said write pulse generating means so as to prohibit writing of the drawing data into said buffer memory when the updated address updated by said address updating means reaches an address corresponding to a non-display area of the CRT screen.

* * * * *